United States Patent
Maeda et al.

(10) Patent No.: US 9,290,592 B2
(45) Date of Patent: Mar. 22, 2016

(54) POLY(DIPHENYLACETYLENE) COMPOUND, PREPARATION METHOD THEREFOR, AND USE THEREOF AS OPTICAL ISOMER SEPARATING AGENT

(71) Applicant: NATIONAL UNIVERSITY CORPORATION KANAZAWA UNIVERSITY, Ishikawa (JP)

(72) Inventors: Katsuhiro Maeda, Ishikawa (JP); Shigeyoshi Kanoh, Ishikawa (JP); Tomoyuki Ikai, Ishikawa (JP); Kouhei Shimomura, Aichi (JP); Yuki Komatsu, Nagano (JP)

(73) Assignee: NATIONAL UNIVERSITY CORPORATION KANAZAWA UNIVERSITY, Ishikawa (JP)

( * ) Notice: Subject to any disclaimer, the term of this patent is extended or adjusted under 35 U.S.C. 154(b) by 0 days.

(21) Appl. No.: 14/767,020

(22) PCT Filed: Aug. 26, 2013

(86) PCT No.: PCT/JP2013/072712
§ 371 (c)(1),
(2) Date: Aug. 11, 2015

(87) PCT Pub. No.: WO2014/125667
PCT Pub. Date: Aug. 21, 2014

(65) Prior Publication Data
US 2015/0376309 A1 Dec. 31, 2015

(30) Foreign Application Priority Data
Feb. 12, 2013 (JP) ................ 2013-024423

(51) Int. Cl.
*C08F 138/00* (2006.01)
*C07B 57/00* (2006.01)
*B01D 15/00* (2006.01)
*B01D 15/08* (2006.01)
*C08F 138/02* (2006.01)
*C08F 38/00* (2006.01)

(52) U.S. Cl.
CPC ............... *C08F 138/02* (2013.01)

(58) Field of Classification Search
CPC ...... C08F 138/00; C07B 57/00; B01J 20/281; B01D 15/08; G01N 30/02
USPC ............ 526/285; 525/328.1; 524/550
See application file for complete search history.

(56) References Cited

U.S. PATENT DOCUMENTS

2003/0114618 A1* 6/2003 Yashima .............. C08F 4/80
526/285

FOREIGN PATENT DOCUMENTS

| JP | 5-271119 | 10/1993 |
| JP | 5-271338 | 10/1993 |
| JP | 7-165823 | 6/1995 |
| JP | 7-258344 | 10/1995 |
| JP | 2005-154742 | 6/2005 |
| JP | 2005-239863 | 9/2005 |
| JP | 2007-314750 | 8/2006 |

OTHER PUBLICATIONS

Saito, et al, Synthesis and Macromolecular Helicity Induction of a Stereoregular Polyacetylene Bearing a Carboxy Group with Natural Amino Acids in Water, Macromolecules 2000, 33, 4616-4618.*
International Search Report issued Nov. 12, 2013 in International Application No. PCT/JP2013/072712. (English Translation).
Written Opinion issued Nov. 12, 2013 in International Application No. PCT/JP2013/072712. (English Translation).

* cited by examiner

*Primary Examiner* — Fred M Teskin
(74) *Attorney, Agent, or Firm* — Wenderoth, Lind & Ponack, L.L.P.

(57) ABSTRACT

The present invention provides an optical isomer separating agent and a production method thereof. That is, the present invention provides a one-handed helical poly(diphenylacetylene) compound represented by the following formula (I)

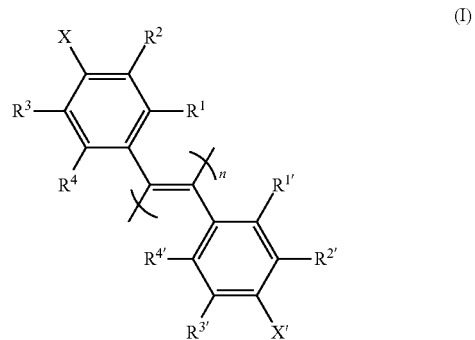

[wherein each symbol is as described in the DESCRIPTION], and a production method thereof, an optical isomer separating agent containing the poly(diphenylacetylene) compound, and a packing material for a chiral column, containing the optical isomer separating agent coated on a carrier. Since these have a superior separation ability for a wide variety of compounds, a practical optical resolution method can be provided.

15 Claims, 3 Drawing Sheets

POLY(DIPHENYLACETYLENE) COMPOUND, PREPARATION METHOD THEREFOR, AND USE THEREOF AS OPTICAL ISOMER SEPARATING AGENT

TECHNICAL FIELD

The present invention relates to an optical isomer separating agent used for separating an optical isomer by a chromatography method, particularly liquid chromatography, and a packing material supporting same, and particularly relates to a helical poly(diphenylacetylene) compound useful as a separating agent for a mixture of optical isomers of a wide variety of chiral compounds and a production method thereof.

BACKGROUND ART

Organic compounds include many optical isomers having completely the same physical, chemical properties, for example, properties such as boiling point, melting point, solubility but showing different physiological activities. In the technical field of medicaments, differences in the pharmacological activity depending on the easiness of binding with a particular receptor in the body have been studied much, and it is widely known that remarkable differences in drug, efficacy and toxicity are often found between optical isomers. Guideline for drug production by the Ministry of Health, Labour and Welfare also describes that it is desirable to study absorption, distribution, metabolism and excretion kinetics of each isomer when a racemate is used as a drug.

As described above, since optical isomers show completely the same physical and chemical properties, they cannot be analyzed by general separation means. Thus, the study of techniques for easily and precisely analyzing optical isomers of a wide variety of organic compounds has been extensively conducted. Of such techniques, particularly, the optical resolution method by high performance liquid chromatography (hereinafter sometimes to be also referred to as HPLC) separates optical isomers by using a substance having an ability to separate optical isomers, i.e., an optical isomer separating agent, per se, or a chiral stationary phase supporting an optical isomer separating agent on a suitable carrier by a chemical bond or coating. For example, a packing material comprising an optically active crown ether compound, which is a low-molecular-weight compound, coated on a carrier (patent document 1), a packing material comprising an optically active triphenylmethyl methacrylate polymer, which is a synthetic polymer, coated on a carrier (patent document 2), a packing material comprising cellulose triacetate, which is a polysaccharide derivative, coated on a carrier (patent document 3), a packing material comprising cellulose benzoate coated on a carrier (patent document 4), a packing material comprising cellulose phenylcarbamate coated on a carrier (patent document 5), a packing material comprising a cellulose or amylose derivative (non-patent document 1), ovomucoid which is a protein (patent document 6) and the like have been developed and, in view of their high optical resolution ability, commercialized and widely used.

DOCUMENT LIST

Patent Documents patent document 1: JP-A-S62-210053
patent document 2: JP-A-S57-150432
patent document 3: JP-A-S60-82858
patent document 4: JP-A-S60-40952
patent document 5: JP-A-S60-108751
patent document 6: JP-A-S63-307829

Non-Patent Document non-patent document 1: Okamoto, Y., Kawashima, M. and Hatada, K. J. Am. Chem. Soc., 1984, 106, 5357.

SUMMARY OF THE INVENTION

Problems to be Solved by the Invention

However, optical isomer separating agents are generally very expensive. While all optical isomer separating agents are superior in the separating ability of particular object compounds (racemates), the range of the optically resolvable compound is extremely limited. Therefore, to expand the range of optically resolvable object compound, the development of a new optical isomer separating agent having a chemical structure different from those of the existing optical isomer separating agents and thereby showing different optical resolution property has been desired.

Means of Solving the Problems

The present inventors have conducted intensive studies under the circumstances and found for the first time that a poly(diphenylacetylene) compound represented by the following formula (I)

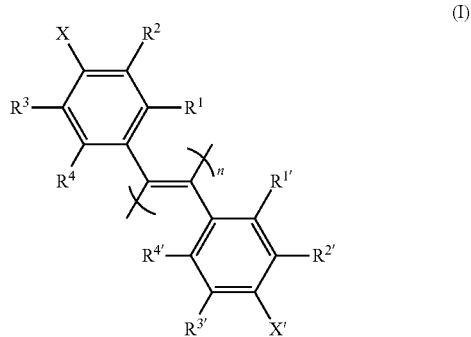

[wherein
$R^1$, $R^{1'}$, $R^2$, $R^{2'}$, $R^3$, $R^{3'}$, $R^4$ and $R^{4'}$ are each independently a hydrogen atom, a halogen atom, an optionally substituted alkyl group, an optionally substituted cycloalkyl group, an optionally substituted alkoxy group, an optionally substituted alkylthio group, a tri-substituted silyl group, a tri-substituted siloxy group or an optionally substituted acyloxy group;
X and X' are each independently an optionally amidated or esterified carboxy group; and
n is an integer of not less than 10]
(hereinafter sometimes to be simply referred to as "compound (I)" or "optically inactive compound (I)") or a salt thereof, or a solvate thereof, which has a one-handed helical structure (hereinafter sometimes to be also referred to as "optically active compound (I)") is useful as a separating agent for an optical isomer mixture of a wide variety of chiral compounds, which resulted in the completion of the present invention.

Therefore, the present invention provides the following.

[1] A poly(diphenylacetylene) compound represented by the formula (I):

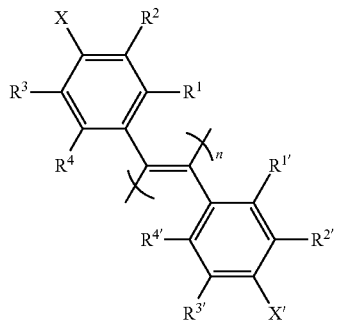

[wherein
$R^1$, $R^{1'}$, $R^2$, $R^{2'}$, $R^3$, $R^{3'}$, $R^4$ and $R^{4'}$ are each independently a hydrogen atom, a halogen atom, an optionally substituted alkyl group, an optionally substituted cycloalkyl group, an optionally substituted alkoxy group, an optionally substituted alkylthio group, a tri-substituted silyl group, a tri-substituted siloxy group or an optionally substituted acyloxy group;
X and X' are each independently an optionally amidated or esterified carboxy group; and
n is an integer of not less than 10],
or a salt thereof, or a solvate thereof.

[2] The compound of the above-mentioned [1], which has a one-handed helical structure, or a salt thereof, or a solvate thereof.

[3] The compound of the above-mentioned [2], wherein each of $R^1$ and $R^{1'}$, $R^2$ and $R^{2'}$, $R^3$ and $R^{3'}$, and $R^4$ and $R^{4'}$ are the same group, or a salt thereof, or a solvate thereof.

[4] The compound of the above-mentioned [2], wherein X and X' are both carboxy groups or $CON(R^5)(R^6)$ (wherein $R^5$ is a hydrogen atom or a $C_{1-6}$ alkyl group, and $R^6$ is an optionally substituted $C_{1-20}$ alkyl group or an optionally substituted aryl group), or a salt thereof, or a solvate thereof.

[5] The compound of the above-mentioned [2], wherein $R^1$, $R^{1'}$, $R^2$, $R^{2'}$, $R^3$, $R^{3'}$, $R^4$ and $R^{4'}$ are each independently a hydrogen atom, a halogen atom, a $C_{1-6}$ alkyl group optionally substituted by halogen atom(s), a $C_{1-6}$ alkoxy group optionally substituted by halogen atom(s), a tri $C_{1-6}$ alkylsilyl group or a tri $C_{1-6}$ alkylsiloxy group, and each of $R^1$ and $R^{1'}$, $R^2$ and $R^{2'}$, $R^3$ and $R^{3'}$, and $R^4$ and $R^{4'}$ are the same group;
X and X' are each $CON(R^5)(R^6)$ (wherein $R^5$ is a hydrogen atom or a $C_{1-6}$ alkyl group, and $R^6$ is a optionally substituted $C_{6-10}$ aryl group); and
n is an integer of not less than 10 and not more than 10000, or a salt thereof, or a solvate thereof.

[6] The compound of the above-mentioned [2], wherein $R^1$, $R^{1'}$, $R^2$, $R^{2'}$, $R^3$, $R^{3'}$, $R^4$ and $R^{4'}$ are each independently a hydrogen atom or a halogen atom, and each of $R^1$ and $R^{1'}$, $R^2$ and $R^{2'}$, $R^3$ and $R^{3'}$, and $R^4$ and $R^{4'}$ is the same group;
X and X' are each $CON(R^5)(R^6)$ (wherein $R^5$ is a hydrogen atom, and $R^6$ is an optionally substituted phenyl group); and
n is an integer of not less than 100 and not more than 10000, or a salt thereof, or a solvate thereof.

[7] An optical isomer separating agent comprising the poly(diphenylacetylene) compound of any of the above-mentioned [2]-[6].

[8] A packing material comprising the optical isomer separating agent of the above-mentioned [7] supported on a carrier.

[9] The packing material of the above-mentioned [8], wherein the carrier is silica gel.

[10] A chiral column prepared by packing with the packing material of the above-mentioned [8] or [9].

[11] The chiral column of the above-mentioned [10], which is for use for the purity measurement or separation of a mixture of optical isomers.

[12] A production method of the compound of the above-mentioned [2], or a salt thereof, or a solvate thereof, comprising a step of mixing an optical inactive poly(diphenylacetylene) compound represented by the formula (II):

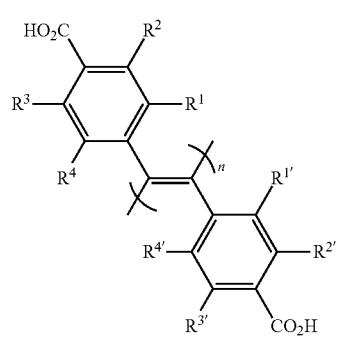

[wherein
$R^1$, $R^{1'}$, $R^2$, $R^{2'}$, $R^3$, $R^{3'}$, $R^4$ and $R^{4'}$ are each independently a hydrogen atom, a halogen atom, an optionally substituted alkyl group, an optionally substituted cycloalkyl group, an optionally substituted alkoxy group, an optionally substituted alkylthio group, a tri-substituted silyl group, a tri-substituted siloxy group or an optionally substituted acyloxy group; and
n is an integer of not less than 10],
with an optically active low-molecular-weight compound, and a step of removing a low-molecular-weight compound.

[13] The method of the above-mentioned [12], further comprising a step of esterification or amidation.

[14] The method the above-mentioned [12] or [13], wherein the optically active low-molecular-weight compound is an optically active form of a compound selected from the group consisting of 2-phenylglycinol, 1-cyclohexylethylamine, 1-(1-naphthyl)ethylamine, 1-(2-naphthyl)ethylamine, sec-butylamine, 1-phenyl-2-(p-tolyl)ethylamine, 1-(p-tolyl)ethylamine, 1-(4-methoxyphenyl)ethylamine, 1-phenylethylamine, β-methylphenethylamine, 2-amino-1-butanol, 2-amino-1,2-diphenylethanol, 1-amino-2-indanol, 2-amino-1-phenyl-1,3-propanediol, 2-amino-1-propanol, leucinol, phenylalaninol, valinol, norephedrine, methioninol, amino acid, amino acid having a protected carboxy group, 3-aminopyrrolidine, 1-benzyl-3-aminopyrrolidine, 1,2-diphenylethylenediamine, 1,2-cyclohexanediamine, 2-(methoxymethyl)pyrrolidine, 1-methyl-2-(1-piperidinomethyl)pyrrolidine and 1-(2-pyrrolidinomethyl)pyrrolidine.

[15] The method of the above-mentioned [12] or [13], wherein the optically active low-molecular-weight compound is (S)-(+)-2-phenylglycinol or (R)-(−)-2-phenylglycinol.

[16] The method of any of the above-mentioned [12]-[15], wherein the optically active low-molecular-weight compound has an optical purity of not less than 99% ee.

[17] The method of any of the above-mentioned [12]-[15], wherein the optically active low-molecular-weight compound has an optical purity of not less than 80% ee.

[18] The method of any of the above-mentioned [12]-[17], wherein the optically active low-molecular-weight compound is removed by washing with solvent.

Effect of the Invention

The optically active compound (I) of the present invention has a superior optical resolution ability for a mixture of optical isomers of a wide variety of compounds, and is not easily racemized at room temperature even in a solution. Therefore, the optically active compound (I) of the present invention is advantageous in that it can be chemically modified variously after induction and memory of helical chirality. In addition, since the optically active compound (I) of the present invention does not have an optically active site (optically active substituent) except a one-handed helical structure, and a commercially available compound can be widely used as an optically active low-molecular-weight compound used for chirality induction, which is 100% recoverable and recyclable, it is also advantageous in cost as compared to conventional optical isomer separating agents. Furthermore, an optically active low-molecular-weight compound used for induction of helical chirality is not necessarily an optically pure (not less than 99% ee) compound and, even when a compound with a low optical purity (not less than 80% ee) is used, a positive nonlinear phenomenon (what is called an "asymmetric amplification phenomenon") is confirmed and the winding direction of helix can be controlled with the same level of optical purity as when an optically pure compound is used. Therefore, a chiral stationary phase having a high optical resolution ability can be produced conveniently at a low cost.

DESCRIPTION OF EMBODIMENTS

Figure 1:
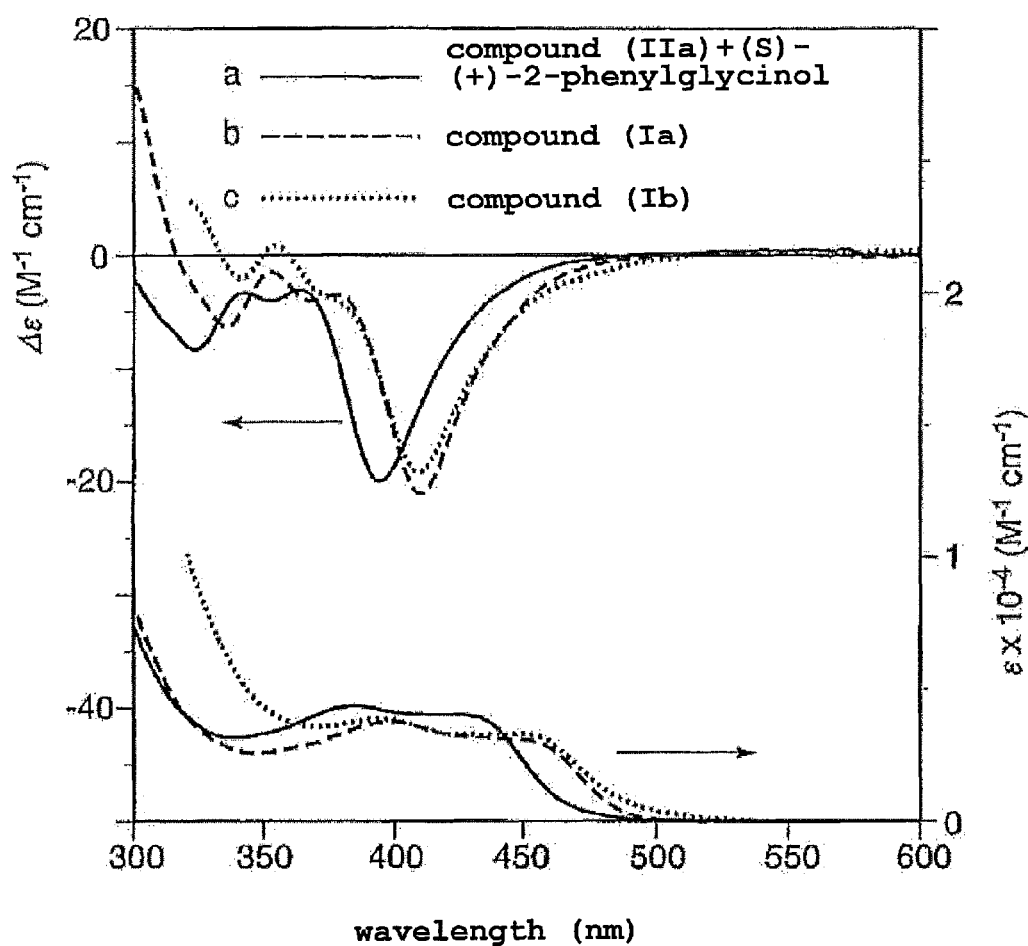
FIG. 1 (a) shows CD and UV spectra of compound (IIa) measured in water in the presence of (S)-(+)-2-phenylglycinol, (b) shows CD and UV spectra of compound (Ia) measured in dimethyl sulfoxide, and (c) shows CD and UV spectra of compound (Ib) measured in tetrahydrofuran.

The detail of the present invention is explained in the following.

DEFINITION

In the present specification, the "halogen atom" means a fluorine atom, a chlorine atom, a bromine atom or an iodine atom.

In the present specification, the "alkyl (group)" means a straight chain or branched chain alkyl group having one or more carbon atoms. When the range of the carbon atom number is not particularly limited, it is preferably a $C_{1-20}$ alkyl group, more preferably a $C_{1-12}$ alkyl group, particularly preferably a $C_{1-6}$ alkyl group.

In the present specification, the "$C_{1-20}$ alkyl (group)" means a straight chain or branched chain alkyl group having 1-20 carbon atoms, and examples thereof include methyl, ethyl, propyl, isopropyl, butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl, 2-ethylbutyl, heptyl, octyl, nonyl, decyl, undecyl, dodecyl, tridecyl, eicosyl and the like.

In the present specification, the "$C_{1-12}$ alkyl (group)" means a straight chain or branched chain alkyl group having 1-12 carbon atoms, and examples thereof include methyl, ethyl, propyl, isopropyl, butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl, 2-ethylbutyl, heptyl, octyl, nonyl, decyl, undecyl, dodecyl and the like.

In the present specification, the "$C_{1-6}$ alkyl (group)" means a straight chain or branched chain alkyl group having 1-6 carbon atoms, and examples thereof include methyl, ethyl, propyl, isopropyl, butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl, 2-ethylbutyl and the like.

In the present specification, the "cycloalkyl (group)" means a cyclic alkyl group. When the range of the carbon atom number is not particularly limited, it is preferably a $C_{3-8}$ cycloalkyl group.

In the present specification, the "$C_{3-8}$ cycloalkyl (group)" means a cyclic alkyl group having 3-8 carbon atoms, and examples thereof include cyclopropyl, cyclobutyl, cyclopentyl, cyclohexyl, cycloheptyl, cyclooctyl and the like. Of these, a $C_{3-6}$ cycloalkyl group is preferable.

In the present specification, the "alkoxy (group)" means a group wherein a straight chain or branched chain alkyl group is bonded to an oxygen atom, and the range of the carbon atom number is not particularly limited. Preferred is a $C_{1-6}$ alkoxy group.

In the present specification, the "$C_{1-6}$ alkoxy (group)" means a straight chain or branched chain alkoxy group having 1-6 carbon atoms, and examples thereof include methoxy, ethoxy, propoxy, isopropoxy, butoxy, isobutoxy, sec-butoxy, tert-butoxy, pentyloxy, isopentyloxy, neopentyloxy, hexyloxy and the like. Of these, a $C_{1-4}$ alkoxy group is preferable.

In the present specification, the "alkylthio (group)" means a group wherein a straight chain or branched chain alkyl group is bonded to a sulfur atom, and the range of the carbon atom number is not particularly limited. Preferred is a $C_{1-6}$ alkylthio group.

In the present specification, the "$C_{1-6}$ alkylthio (group)" means a straight chain or branched chain alkylthio group having 1-6 carbon atoms, and examples thereof include methylthio, ethylthio, propylthio, isopropylthio, butylthio, isobutylthio, sec-butylthio, tert-butylthio, pentylthio, isopentylthio, neopentylthio, hexylthio and the like. Of these, a $C_{1-4}$ alkylthio group is preferable.

In the present specification, the "alkylsulfonyl (group)" means a group wherein a straight chain or branched chain alkyl group is bonded to a sulfonyl group, and the range of the carbon atom number is not particularly limited. Preferred is a $C_{1-6}$ alkylsulfonyl group.

In the present specification, the "$C_{1-6}$ alkylsulfonyl (group)" means a group wherein a straight chain or branched chain alkyl group having 1-6 carbon atoms is bonded to a sulfonyl group, and examples thereof include methylsulfonyl, ethylsulfonyl, propylsulfonyl, isopropylsulfonyl, butylsulfonyl, isobutylsulfonyl, sec-butylsulfonyl, tert-butylsulfonyl, pentylsulfonyl, isopentylsulfonyl, neopentylsulfonyl, 1-ethylpropylsulfonyl, hexylsulfonyl, isohexylsulfonyl, 1,1-dimethylbutylsulfonyl, 2,2-dimethylbutylsulfonyl, 3,3-dimethylbutylsulfonyl, 2-ethylbutylsulfonyl and the like.

In the present specification, the "arylsulfonyl (group)" means a group wherein an aryl group is bonded to a sulfonyl group, and the range of the carbon atom number is not particularly limited. Preferred is a $C_{6-10}$ arylsulfonyl group.

In the present specification, the "$C_{6-10}$ arylsulfonyl group" means a group wherein a "$C_{6-10}$ aryl group" is bonded to a sulfonyl group, and examples thereof include phenylsulfonyl, 1-naphthylsulfonyl, 2-naphthylsulfonyl and the like.

In the present specification, the "alkylsulfonyloxy (group)" means a group wherein an alkylsulfonyl group is bonded to an oxygen atom, and the range of the carbon atom number is not particularly limited. Preferred is a $C_{1-6}$ alkylsulfonyloxy group.

In the present specification, the "$C_{1-6}$ alkylsulfonyloxy (group)" means a group wherein a $C_{1-6}$ alkylsulfonyl group is bonded to an oxygen atom, and examples thereof include methylsulfonyloxy, ethylsulfonyloxy, propylsulfonyloxy, isopropylsulfonyloxy, butylsulfonyloxy and the like.

In the present specification, the "arylsulfonyloxy (group)" means a group wherein an arylsulfonyl group is bonded to an oxygen atom, and the range of the carbon atom number is not particularly limited. Preferred is a $C_{6-10}$ arylsulfonyloxy group.

In the present specification, the "$C_{6-10}$ arylsulfonyloxy (group)" means a group wherein a $C_{6-10}$ arylsulfonyl group is bonded to an oxygen atom, and examples thereof include phenylsulfonyloxy, 1-naphthylsulfonyloxy, 2-naphthylsulfonyloxy and the like.

In the present specification, the "acyl (group)" means alkanoyl or aroyl, and the range of the carbon atom number is not particularly limited. Preferred is a $C_{1-7}$ alkanoyl group or $C_{7-11}$ aroyl.

In the present specification, the "$C_{1-7}$ alkanoyl (group)" is a straight chain or branched chain formyl or alkylcarbonyl having 1-7 carbon atoms, and examples thereof include formyl, acetyl, propionyl, butyryl, isobutyryl, pentanoyl, hexanoyl, heptanoyl and the like.

In the present specification, the "$C_{7-11}$ aroyl (group)" is arylcarbonyl having 7-11 carbon atoms, and examples thereof include benzoyl and the like.

In the present specification, the "acyloxy (group)" means a group wherein an alkanoyl group or an aroyl group is bonded to an oxygen atom, and the range of the carbon atom number is not particularly limited. Preferred is a $C_{1-7}$ alkanoyloxy group or a $C_{7-11}$ aroyloxy group.

In the present specification, examples of the "$C_{1-7}$ alkanoyloxy (group)" include formyloxy, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, neopentylcarbonyloxy, hexylcarbonyloxy and the like.

In the present specification, examples of the "$C_{7-11}$ aroyloxy (group)" include benzoyloxy, 1-naphthoyloxy, 2-naphthoyloxy and the like.

In the present specification, the "aryl (group)" means an aromatic monocyclic or aromatic polycyclic (fused) hydrocarbon group, and specific examples thereof include $C_{6-14}$ aryl groups such as phenyl, 1-naphthyl, 2-naphthyl, biphenylyl, 2-anthryl and the like. Of these, a $C_{6-10}$ aryl group is preferable.

In the present specification, the "$C_{6-10}$ aryl (group)" is, for example, phenyl, 1-naphthyl or 2-naphthyl, and phenyl is particularly preferable.

In the present specification, the "aralkyl (group)" means a group wherein an alkyl group is substituted by an aryl group, and the range of the carbon atom number is not particularly limited. Preferred is $C_{7-14}$ aralkyl.

In the present specification, the "$C_{7-14}$ aralkyl(group)" means a group wherein the "$C_{1-4}$ alkyl group" is substituted by the "$C_{6-10}$ aryl group", and examples thereof include benzyl, 1-phenylethyl, 2-phenylethyl, (naphthyl-1-yl)methyl, (naphthyl-2-yl)methyl, 1-(naphthyl-1-yl)ethyl, 1-(naphthyl-2-yl)ethyl, 2-(naphthyl-1-yl)ethyl, 2-(naphthyl-2-yl)ethyl, biphenylylmethyl and the like.

In the present specification, the "tri-substituted silyl (group)" means a silyl group substituted by the same or different three substituents (e.g., $C_{1-6}$ alkyl group, $C_{6-10}$ aryl group etc.), and preferable examples of the group include trialkylsilyl groups such as trimethylsilyl group, triethylsilyl group, triisopropylsilyl group, tert-butyldimethylsilyl group and the like (preferably, tri $C_{1-6}$ alkylsilyl group), tert-butyldiphenylsilyl group, triphenylsilyl group and the like.

In the present specification, the "tri-substituted siloxy (group)" means a group wherein a tri-substituted silyl group is bonded to an oxygen atom. As the group, trialkylsiloxy group such as trimethylsiloxy group, triethylsiloxy group, triisopropylsiloxy group, tert-butyldimethylsiloxy group and the like (preferably, tri $C_{1-6}$ alkylsiloxy group) is preferable.

In the present specification, the "protected amino group" means an amino group protected by a "protecting group". As the "protecting group", the amino-protecting groups described in Protective Groups in Organic Synthesis, John Wiley and Sons (1980) can be used, and examples thereof include protecting groups such as $C_{1-6}$ alkyl group, $C_{7-14}$ aralkyl group, $C_{6-10}$ aryl group, $C_{1-7}$ alkanoyl group, $C_{7-14}$ aralkyl-carbonyl group, tri $C_{1-6}$ alkylsilyl group and the like. The above-mentioned protecting group is optionally further substituted by halogen atom, $C_{1-6}$ alkyl group, $C_{1-6}$ alkoxy group or nitro group. Specific examples of the amino-protecting group include methyl, acetyl, trifluoroacetyl, pivaloyl, tert-butoxycarbonyl, benzyloxycarbonyl and the like.

In the present specification, "optionally substituted" means optionally having one or more substituents, and examples of the "substituent" include (1) halogen atom, (2) nitro, (3) cyano, (4) $C_{1-6}$ alkyl, (5) $C_{3-8}$ cycloalkyl, (6) $C_{1-6}$ alkoxy, (7) $C_{6-10}$ aryl, (8) $C_{7-14}$ aralkyl, (9) $C_{1-7}$ alkanoyloxy, (10) $C_{7-11}$ aroyloxy, (11) $C_{1-7}$ alkanoyl, (12) $C_{7-11}$ aroyl, (13) azido, (14) $C_{1-6}$ alkylthio, (15) $C_{6-10}$ arylthio, (16) carbamoyl optionally substituted by $C_{1-6}$ alkyl group, (17) $C_{1-6}$ alkylsulfonyloxy group, (18) $C_{6-10}$ arylsulfonyloxy group, (19) tri $C_{1-6}$ alkylsilyl group, (20) tri $C_{1-6}$ alkylsiloxy group, (21) protected amino group and the like. The "optionally substituted" substituent of the group for $R^1$, $R^{1'}$, $R^2$, $R^{2'}$, $R^3$, $R^{3'}$, $R^4$ or $R^{4'}$ is preferably a halogen atom, $C_{1-6}$ alkyl, $C_{3-8}$ cycloalkyl, $C_{1-6}$ alkoxy, $C_{6-10}$ aryl, $C_{7-14}$ aralkyl, $C_{1-6}$ alkylthio, tri $C_{1-6}$ alkylsilyl, tri $C_{1-6}$ alkylsiloxy and the like, more preferably a halogen atom, $C_{1-6}$ alkyl, $C_{1-6}$ alkoxy, tri $C_{1-6}$ alkylsilyl, tri $C_{1-6}$ alkylsiloxy and the like, particularly preferably a halogen atom. The "optionally substituted" substituent of the group for $R^5$, $R^6$, $R^7$, $R^{7'}$ or $R^8$ may be any of the above-mentioned substituents. Preferred are a halogen atom, $C_{1-6}$ alkyl, $C_{1-6}$ alkoxy, acetyl, formyl, carbamoyl, azido, tri $C_{1-6}$ alkylsilyl, tri $C_{1-6}$ alkylsiloxy, dimethylamino, acetylamino, tert-butoxycarbonylamino, benzyloxycarbonylamino and the like.

When plural substituents are present, the respective substituents may be the same or different.

The above-mentioned substituents may be further substituted by the above-mentioned substituents. While the number of the substituents is not particularly limited as long as it is a substitutable number, it is preferably 1 to 5, more preferably 1 to 3. When plural substituents are present, the respective substituents may be the same or different.

In the present specification, the "one-handed helical structure" may be a right-handed or left-handed lopsided helical structure, and it is preferably a completely right-handed or left-handed helical structure. A compound having a "one-handed helical structure" is an optically active compound.

In the present specification, "optically active" means the property to rotate plane polarized light, that is, having an optical rotatory power. It is preferably an optically pure state.

In the present specification, the "optically active low-molecular-weight compound" is a low-molecular-weight compound having the property to rotate plane-polarized light, that is, having an optical rotatory power, and an organic compound having a molecular weight of 1000 or below, and is not particularly limited. Preferably, it is an optically pure compound having one asymmetric carbon atom, and examples thereof include optically active forms of chiral compounds such as 2-phenylglycinol, 1-cyclohexylethylamine, 1-(1-naphthyl)ethylamine, 1-(2-naphthyl)ethylamine, sec-butylamine, 1-phenyl-2-(p-tolyl)ethylamine, 1-(p-tolyl)ethylamine, 1-(4-methoxyphenyl)ethylamine, 1-phenylethylamine, β-methylphenethylamine, 2-amino-1-butanol, 2-amino-1,2-diphenylethanol, 1-amino-2-indanol, 2-amino-1-phenyl-1,3-propanediol, 2-amino-1-propanol, leucinol, phenylalaninol, valinol, norephedrine, methioninol, amino acid, amino acid having protected carboxy group, 3-aminopyrrolidine, 1-benzyl-3-aminopyrrolidine, 1,2-diphenylethylenediamine, 1,2-cyclohexanediamine, 2-(methoxymethyl)pyrrolidine, 1-methyl-2-(1-piperidinomethyl)pyrrolidine, 1-(2-pyrrolidinomethyl)pyrrolidine and the like, whose optically pure, both enantiomers are available as commercially available products. Of these, (R)-(−)-2-phenylglycinol, (S)-(+)-2-phenylglycinol, (R)-(+)-1-phenylethylamine or (S)-(−)-1-phenylethylamine is particularly preferable. As the optically active low-molecular-weight compound, an optically pure compound is preferably used as mentioned above. As mentioned below, however, even when a compound having a low optical purity is used, a positive nonlinear phenomenon (what is called "asymmetric amplification phenomenon") is also confirmed, and helical chirality can be induced with an optical purity of the same level as that of using an optically pure compound. Therefore, the "optically active low-molecular-weight compound" encompasses not only an optically pure compound, but also a compound having a low optical purity. The low-molecular-weight compound may be liquid or solid, preferably liquid.

In the present specification, "ee" is an abbreviation of enantiomeric excess, and shows optical purity of a chiral compound. The "ee" is calculated by subtracting a smaller amount of substance of enantiomer from a larger amount of substance of enantiomer, dividing the value by the whole amount of substance and multiplying the value by 100, and is shown by "% ee".

In the present specification, "optically pure" means a state of optical purity of not less than 99% ee.

In the present specification, the "enantiomer" means an optical antipode having different steric configurations of all asymmetric carbon atoms in an optically active low-molecular-weight compound, which constitutes a pair of optical isomers in m the right hand-left hand relationship to the optically active low-molecular-weight compound. Specifically, for example, when the optically active low-molecular-weight compound is (R)-(−)-2-phenylglycinol, the enantiomer is (S)-(+)-2-phenylglycinol.

In the present specification, "inverting winding direction of helix" means inverting one-handed helix to a reverse-handed helix and, specifically means, for example, inverting a right-handed helical structure to a left-handed helical structure. While it is desirable to completely invert the winding direction of helix, "inverting winding direction of helix" does not necessarily mean only an embodiment of complete inversion of the winding direction of helix, but also encompasses an embodiment of conversion to a helical structure lopsided toward reverse-handed winding (only needs to be converted to a compound having specific optical rotation of opposite symbol).

In the present specification, "chiral compound" means a compound having central chirality, axial chirality or planar chirality and, for example, a compound having central chirality (asymmetric center, i.e., asymmetric carbon atom) can be mentioned.

In the present specification, the "racemate" or "racemization" means a compound that does not show optical rotation due to the presence of equal amounts of two kinds of enantiomers of a chiral compound, or changing to such state.

In the present specification, the "optical isomer separating agent" only needs to be a substance having an ability to separate a mixture of optical isomers of a low-molecular-weight compound, and is not particularly limited.

Examples of a method of optical resolution of an optically active compound by using the optical isomer separating agent of the present invention include, but are not particularly limited, chromatography methods such as gas chromatography, liquid chromatography, supercritical chromatography, thin layer chromatography, capillary electrophoresis and the like, optical isomer separation by membrane separation and the like.

When the optical isomer separating agent of the present invention is used, for example, as a stationary phase of a column packing material for high performance liquid chromatography, the eluent is not particularly limited as long as it is not a liquid that dissolves or reacts with the separating agent of the present invention, and the separating agent is applicable to both a normal-phase using hexane-2-propanol and the like, and a reverse-phase using alcohol-water and the like.

In the present invention, optically active compound (I) per se can also be used as an optical isomer separating agent. However, it is preferably supported on some carrier for the purpose of improving the pressure resistance of the separating agent, preventing swelling and contraction due to solvent substitution, improving the number of theoretical plates and the like.

Examples of the carrier to be used in the present invention include porous organic carrier and porous inorganic carrier, with preference given to porous inorganic carrier. Suitable as a porous organic carrier is a polymer substance composed of polystyrene, polyacrylamide, polyacrylate and the like, and suitable as a porous inorganic carrier are silica gel, alumina, magnesia, glass, kaolin, titanium oxide, silicate, hydroxyapatite and the like. Particularly preferred carrier is silica gel.

A method of supporting the compound (I) of the present invention on a carrier is not particularly limited and may be a physical method or a chemical method. Examples of the physical method include a method of contacting compound (I) with a porous inorganic carrier or porous organic carrier. Examples of the chemical method include a method of imparting, during the production of compound (I), a functional group to a terminal of the polymer thereof, and chemically binding the functional group to a functional group on the surface of a porous inorganic carrier or a porous organic carrier.

The amount of the compound (I) of the present invention to be supported varies depending on the kind and property of the carrier to be used and is not particularly limited. It is generally within the range of 1-1000 wt % relative to the weight of the carrier.

The packing material of the present invention is generally used for optical isomer separation by the chromatography method such as gas chromatography, liquid chromatography, supercritical chromatography, thin layer chromatography, capillary electrophoresis and the like, or membrane separation, and particularly preferably applied to the liquid chromatography method.

Furthermore, the packing material of the present invention is preferably used for an analytical chiral column of high performance liquid chromatography mainly aiming at optical purity measurement, a preparative chiral column of single column system liquid chromatography aiming at obtaining several mg-several kg of an optically active form, a preparative chiral column of continuous liquid chromatography represented by a simulated moving bed system and the like.

The optical isomer separating agent of the present invention is utilizable not only for the above-mentioned packing material for liquid chromatography, but also as a shift reagent for nuclear magnetic resonance spectrum (NMR) and the like.

A mixture of optical isomers that can be separated by the optical isomer separating agent of the present invention, or a chiral column using a packing material supporting the optical isomer separating agent as a chiral stationary phase is not particularly limited, and can be preferably used for the separation of optical isomers of a wide variety of low-molecular-weight compounds having a molecular weight of not more than 500. Examples of the low-molecular-weight compound include, but are not particularly limited to, trans-stilbene oxide, Tröger's base (Troeger's base), 2-phenylcyclohexanone, optionally substituted binaphthol, alkylether of binaphthol, substituted cyclopropanes, 1-phenylethylalcohol, metal acetyl acetonate complex (cobalt, chromium, ruthenium etc.), mono-substituted [2.2]paracyclophane and the like.

(Compound (I) of the Present Invention)

Compound (I) of the present invention is a poly(diphenylacetylene) compound represented by the following formula (I):

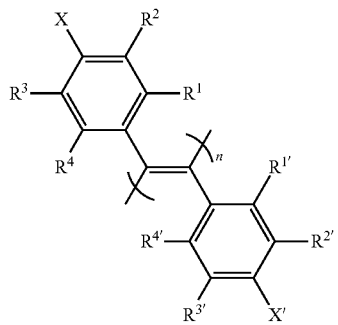

(I)

[wherein
$R^1$, $R^{1'}$, $R^2$, $R^{2'}$, $R^3$, $R^{3'}$, $R^4$ and $R^{4'}$ are each independently a hydrogen atom, a halogen atom, an optionally substituted alkyl group, an optionally substituted cycloalkyl group, an optionally substituted alkoxy group, an optionally substituted alkylthio group, a tri-substituted silyl group, a tri-substituted siloxy group or an optionally substituted acyloxy group;
X and X' are each independently an optionally amidated or esterified carboxy group; and
n is an integer of not less than 10],
particularly, a compound having a one-handed helical structure (that is, optically active compound (I)).

Examples of the salt of the compound (I) of the present invention include a salt with an inorganic acid, a salt with an organic acid, a salt with an inorganic base, a salt with an organic base, a salt with an amino acid and the like.

Examples of the salt with an inorganic acid include salts with hydrochloric acid, nitric acid, sulfuric acid, phosphoric acid, hydrobromic acid and the like.

Examples of the salt with an organic acid include salts with oxalic acid, maleic acid, citric acid, fumaric acid, lactic acid, malic acid, succinic acid, tartaric acid, acetic acid, trifluoroacetic acid, gluconic acid, ascorbic acid, methanesulfonic acid, benzenesulfonic acid, p-toluenesulfonic acid and the like.

Examples of the salt with an inorganic base include sodium salt, potassium salt, calcium salt, magnesium salt, ammonium salt and the like.

Examples of the salt with an organic base include methylamine, diethylamine, trimethylamine, triethylamine, ethanolamine, diethanolamine, triethanolamine, ethylenediamine, tris(hydroxymethyl)methylamine, dicyclohexylamine, N,N'-dibenzylethylenediamine, guanidine, pyridine, picoline, choline, cinchonine, meglumine and the like.

Examples of the salt with an amino acid include salts with lysine, arginine, aspartic acid, glutamic acid and the like.

The salt of compound (I) of the present invention is preferably a salt with an inorganic base or an organic base.

A solvate of the compound (I) of the present invention or a salt thereof is the compound (I) of the present invention or a salt thereof coordinated with a solvent molecule, and also encompasses a hydrate. Examples thereof include hydrate, ethanol solvate, dimethyl sulfoxide solvate and the like of the compound (I) of the present invention or a salt thereof.

Each group of the compound (I) of the present invention is explained below.

$R^1$, $R^{1'}$, $R^2$, $R^{2'}$, $R^3$, $R^{3'}$, $R^4$ and $R^{4'}$ are each independently a hydrogen atom, a halogen atom, an optionally substituted alkyl group, an optionally substituted cycloalkyl group, an optionally substituted alkoxy group, an optionally substituted alkylthio group, a tri-substituted silyl group, a tri-substituted siloxy group or an optionally substituted acyloxy group.

$R^1$, $R^{1'}$, $R^2$, $R^{2'}$, $R^3$, $R^{3'}$, $R^4$ and $R^{4'}$ are preferably each independently a hydrogen atom, a halogen atom, an optionally substituted alkyl group, an optionally substituted alkoxy group, a trialkylsilyl group or a trialkylsiloxy group, more preferably, each independently a hydrogen atom, a halogen atom, a $C_{1-6}$ alkyl group optionally substituted by halogen atom(s), a $C_{1-6}$ alkoxy group optionally substituted by halogen atom(s), a tri $C_{1-6}$ alkylsilyl group or a tri $C_{1-6}$ alkylsiloxy group, and a hydrogen atom or a halogen atom is particularly preferable.

In $R^1$, $R^{1'}$, $R^2$, $R^{2'}$, $R^3$, $R^{3'}$, $R^4$ and $R^{4'}$, each of $R^1$ and $R^{1'}$, $R^2$ and $R^{2'}$, $R^3$ and $R^{3'}$, and $R^4$ and $R^{4'}$ are preferably the same group. All of $R^1$, $R^{1'}$, $R^2$, $R^{2'}$, $R^3$, $R^{3'}$, $R^4$ and $R^{4'}$ may be the same group.

X and X' are each independently an optionally amidated or esterified carboxy group.

Preferably, X and X' are each independently a carboxy group or $CON(R^5)(R^6)$ (wherein $R^5$ is a hydrogen atom or a $C_{1-6}$ alkyl group, $R^6$ is an optionally substituted $C_{1-20}$ alkyl group or an optionally substituted aryl group).

More preferably, X and X' are each independently CON($R^5$) ($R^6$) (wherein $R^5$ is a hydrogen atom, and $R^6$ is an optionally substituted $C_{6-10}$ aryl group).

Particularly preferably, X and X' are each independently CON($R^5$) ($R^6$) (wherein $R^5$ is a hydrogen atom, and $R^6$ is an optionally substituted phenyl group (e.g., phenyl group)).

X and X' are preferably the same group.

n is an integer of not less than 10, preferably an integer of not less than 100 and not more than 10000.

As the compound (I) of the present invention, the following compound is preferable.

[Compound (IA)]
Compound (I) wherein
$R^1$, $R^{1'}$, $R^2$, $R^{2'}$, $R^3$, $R^{2'}$, $R^4$ and $R^{4'}$ are each independently a hydrogen atom, a halogen atom, an optionally substituted alkyl group, an optionally substituted alkoxy group, a trialkylsilyl group or a trialkylsiloxy group, and each of $R^1$ and $R^{1'}$, $R^2$ and $R^{2'}$, $R^3$ and $R^{2'}$, and $R^4$ and $R^{4'}$ is the same group;

X and X' are the same and is a carboxy group or CON($R^5$) ($R^6$) (wherein $R^5$ is a hydrogen atom or a $C_{1-6}$ alkyl group, $R^6$ is an optionally substituted $C_{1-20}$ alkyl group or an optionally substituted aryl group); and n is an integer of not less than 10.

More preferable compound (I) is the following compound.

[Compound (IB)]
Compound (I) wherein
$R^1$, $R^{1'}$, $R^2$, $R^{2'}$, $R^3$, $R^{2'}$, $R^4$ and $R^{4'}$ are each independently a hydrogen atom, a halogen atom, a $C_{1-6}$ alkyl group optionally substituted by halogen atom(s), a $C_{1-6}$ alkoxy group optionally substituted by halogen atom(s), a tri $C_{1-6}$ alkylsilyl group or a tri $C_{1-6}$ alkylsiloxy group, and each of $R^1$ and $R^{1'}$, $R^2$ and $R^{2'}$, $R^3$ and $R^{2'}$, and $R^4$ and $R^{4'}$ are the same group;

X and X' are the same, and CON($R^5$) ($R^6$) (wherein $R^5$ is a hydrogen atom or a $C_{1-6}$ alkyl group, and $R^6$ is an optionally substituted $C_{6-10}$ aryl group); and n is an integer of not less than 10 and not more than 10000.

More preferable compound (I) is the following compound.

[Compound (IC)]
Compound (I) wherein
$R^1$, $R^{1'}$, $R^2$, $R^{2'}$, $R^3$, $R^{3'}$, $R^4$ and $R^{4'}$ are each independently a hydrogen atom or a halogen atom, and each of $R^1$ and $R^{1'}$, $R^2$ and $R^{2'}$, $R^3$ and $R^{3'}$, and $R^4$ and $R^{4'}$ are the same group;

X and X' are the same, and CON($R^5$) ($R^6$) (wherein $R^5$ is a hydrogen atom, and $R^6$ is an optionally substituted phenyl group); and n is an integer of not less than 100 and not more than 10000.

Particularly preferable compound (I) includes the above-mentioned compound (IA), compound (IB) and compound (IC), which have a one-handed helical structure (that is, optically active compound (IA), optically active compound (IB) and optically active compound (IC)).

The number average degree of polymerization (average number of diphenylethylene units contained in one molecule) of the compound (I) of the present invention is not less than 10, preferably not less than 100 and does not have a particular upper limit. However, it is desirably not more than 10000 for easy handling.

The compound (I) of the present invention may be labeled with an isotope (e.g., $^3H$, $^2H(D)$, $^{14}C$, $^{35}S$ etc.).

(Synthesis of the Compound (I) of the Present Invention)

While the production method of the compound (I) of the present invention is not particularly limited, for example, the compound (I) can be synthesized via the following reactions.

Unless otherwise specified, the starting compound is easily available as a commercially available product, or can be produced according to a method known per se or a method analogous thereto.

The compounds obtained in each step in the following reaction scheme can also be used for the next reaction directly as a reaction mixture or a crude product. Alternatively, the compound can also be isolated from a reaction mixture according to a conventional method, and can be easily purified by a general separation means such as recrystallization, distillation, chromatography and the like.

Compound (I) of the present invention can be produced, for example, by the following steps.

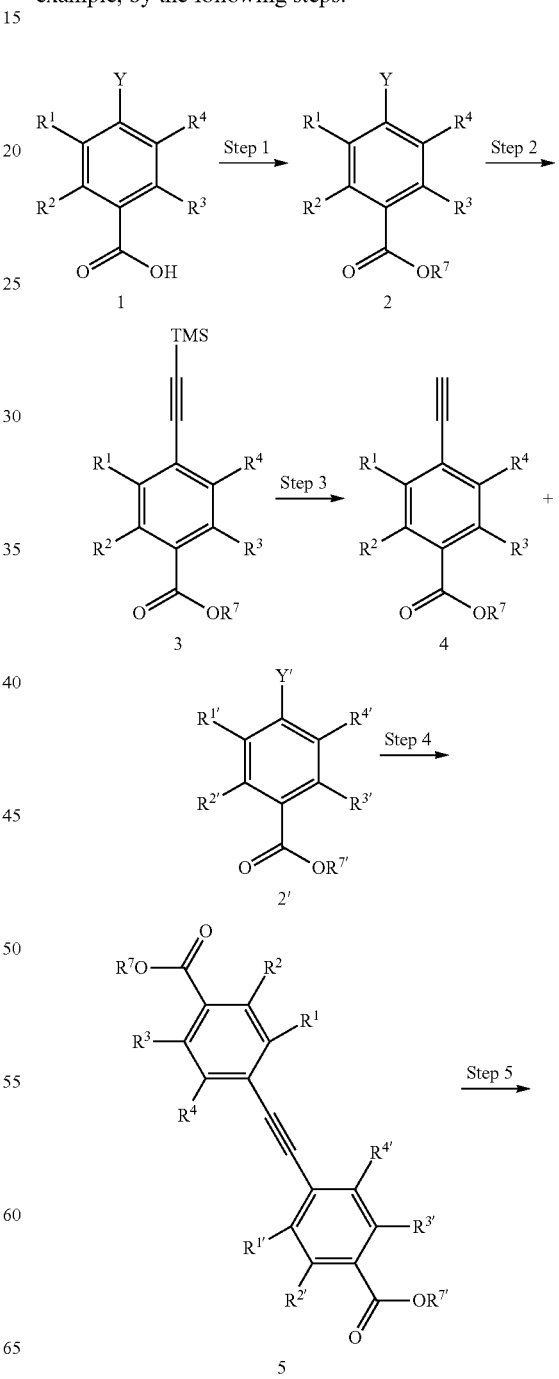

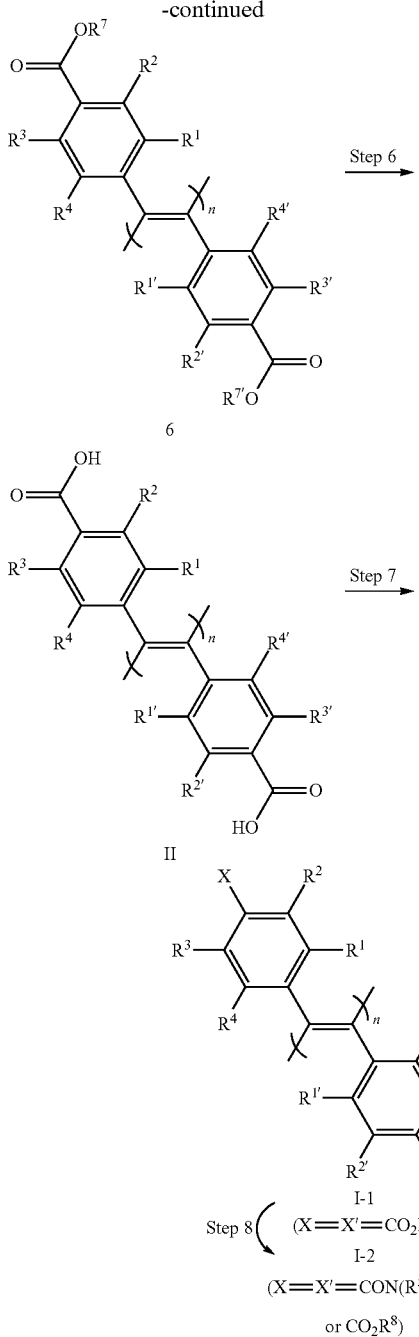

[wherein Y and Y' are each a leaving group such as a halogen atom, a trifluoromethanesulfonyloxy group and the like, $R^7$ and $R^{7'}$ are each an optionally substituted alkyl group, an optionally substituted aryl group, or an optionally substituted aralkyl group, $R^8$ is as defined for $R^7$ and $R^{7'}$, and other symbols are as defined above].

Step 1

In this step, compound 1 is esterified to produce compound 2.

The reaction is performed by a method known per se (e.g., a method of converting to acid halide and reacting same with alcohol ($R^7OH$), a method of reacting with alcohol ($R^7OH$) in the presence of a condensing agent and a base, etc.).

Examples of the halogenating agent to be used for conversion to acid halide include thionyl chloride, oxalyl chloride and the like.

Examples of the solvent include aromatic hydrocarbons such as toluene, xylene and the like; ethers such as diethyl ether, tetrahydrofuran, dioxane and the like; halogenated hydrocarbons such as chloroform, dichloromethane and the like and the like and a mixture thereof.

The reaction temperature is generally –10° C.-30° C., preferably 0° C.-20° C., and the reaction time is generally 1-30 hr.

Examples of the condensing agent include dicyclohexylcarbodiimide (DCC), diisopropylcarbodiimide (DIC), N-ethyl-N'-[3-(dimethylamino)propyl]carbodiimide and hydrochloride thereof (EDC.HCl), (benzotriazol-1-yloxy)tripyrrolidinophosphonium hexafluorophosphate (PyBop), O-(benzotriazol-1-yl)-N,N,N',N'-tetramethyluronium tetrafluoroborate (TBTU), 1-[bis(dimethylamino)methylene]-5-chloro-1H-benzotriazolium 3-oxide hexafluorophosphate (HCTU), O-benzotriazole-N,N,N',N'-tetramethyluronium hexafluoroborate (HBTU) and the like.

The amount of the condensing agent to be used is 1-10 equivalents, preferably 1-5 mol, relative to compound 1 (1 equivalent).

Examples of the solvent include aromatic hydrocarbons such as toluene, xylene and the like; ethers such as diethyl ether, tetrahydrofuran, dioxane and the like; halogenated hydrocarbons such as chloroform, dichloromethane and the like and the like and a mixture thereof. Of these, toluene, tetrahydrofuran and the like are preferable.

The reaction temperature is generally –10° C.-30° C., preferably 0° C.-20° C., and the reaction time is generally 1-30 hr.

Step 2

In this step, a leaving group Y (preferably iodine) of compound 2 is substituted by a trimethylsilylethynyl group under Sonogashira coupling conditions to convert same to compound 3.

The reaction is performed using a metal catalyst in a solvent that does not influence the reaction in the presence of a base.

Examples of the metal catalyst include palladium compounds such as tetrakis(triphenylphosphine)palladium(0) (Pd(PPh$_3$)$_4$), tris(dibenzylideneacetone)dipalladium(0) (Pd$_2$(dba)$_3$), dichloro bis(triphenylphosphine)palladium(II) (Pd(PPh$_3$)$_2$Cl$_2$), dichloro bis(acetonitrile)palladium(II) ((CH$_3$CN)$_2$PdCl$_2$) and the like. Of these, dichloro bis(triphenylphosphine)palladium(II) is preferable.

The amount of the metal catalyst to be used is generally 0.001-1 equivalent relative to compound 2 (1 equivalent).

Examples of the base include organic bases such as triethylamine and the like, inorganic bases such as ammonia and the like. Of these, triethylamine is preferable.

The base can also be used as a solvent. The amount of the base to be used is generally 10-1000 equivalents relative to compound 2 (1 equivalent).

In this step, additives such as copper compounds (copper iodide, copper bromide and the like), phosphine compounds (2-dicyclohexylphosphino-2',4',6'-triisopropylbiphenyl and the like) and the like may be added as necessary.

Examples of the solvent include etheric solvents such as tetrahydrofuran, 1,4-dioxane and the like, polar solvents such as acetonitrile, dimethylformamide and the like, and hydrocarbon solvents such as benzene and the like. Of these, tetrahydrofuran is preferable.

The reaction temperature is generally –10° C.-100° C., preferably 0° C.-50° C.

The reaction time is generally 0.5-24 hr.

Step 3

In this step, a trimethylsilyl group of compound 3 is removed to convert same to compound 4.

The reaction is performed using a base or a fluoride ion source such as tetra-n-butylammonium fluoride and the like in a solvent that does not influence the reaction.

Examples of the base include inorganic bases such as potassium carbonate, cesium carbonate, sodium carbonate and the like. Of these, potassium carbonate is preferable.

The amount of the base to be used is generally 1-10 equivalents relative to compound 3 (1 equivalent).

Examples of the solvent include etheric solvents such as tetrahydrofuran (THF), diethyl ether, tert-butyl methyl ether, diisopropyl ether, ethylene glycol-dimethylether (DME), diethylene glycol dimethylether (diglyme) and the like, alcoholic solvents such as methanol, ethanol and the like, mixed solvents such as tetrahydrofuran and methanol, DME and methanol, and the like. Of these, a mixed solvent of tetrahydrofuran and methanol is preferable.

The reaction temperature is generally $-20°$ C.-$100°$ C., preferably $-10°$ C.-$40°$ C.

The reaction time is generally 0.5-24 hr.

Step 4

In this step, a coupling reaction of a leaving group Y' (preferably iodine) of compound 2' and compound 4 is performed under Sonogashira coupling conditions to convert same to compound 5.

The coupling reaction can be performed in the same reaction form and reaction conditions as in step 2.

Step 5

In this step, compound 5 is converted to compound 6 by polymerization.

The reaction is performed using a metal catalyst under a nitrogen atmosphere in a solvent that does not influence the reaction.

Preferred as the metal catalyst is a mixed catalyst of tungsten (VI) chloride and tetraphenyltin (IV).

The amount of the metal catalyst to be used is generally 0.0001-0.2 equivalent, preferably 0.001-0.1 equivalent, relative to compound 5 (1 equivalent).

Examples of the solvent include aromatic hydrocarbons such as toluene, xylene and the like; ethers such as tetrahydrofuran, dioxane and the like and the like and a mixture thereof. Of these, toluene and the like are preferable.

The amount of the solvent to be used in the step is, for example, preferably an amount that sets the concentration of compound 5 to about 0.001-1M, particularly preferably about 0.1-0.5M.

The reaction temperature is generally $-10°$ C.-$200°$ C., preferably $10°$ C.-$120°$ C.

The reaction time is generally 0.5-30 hr.

Step 6

In this step, ester of compound 6 is hydrolyzed to convert same to compound (II).

The reaction is performed using a base in a solvent that does not influence the reaction.

Examples of the base include inorganic bases such as potassium hydroxide, sodium hydroxide and the like. Of these, potassium hydroxide is preferable.

The amount of the base to be used is generally 1-100 equivalents relative to compound 6 (1 equivalent).

Examples of the solvent include mixed solvents of etheric solvents such as tetrahydrofuran (THF), diethyl ether, tert-butyl methyl ether, diisopropyl ether, ethylene glycol-dimethylether (DME), diethylene glycol dimethylether (diglyme) and the like, and water, and the like. Of these, a mixed solvent of tetrahydrofuran and water is preferable.

The reaction temperature is generally $0°$ C.-$100°$ C., preferably $10°$ C.-$80°$ C.

The reaction time is generally 0.5-30 hr.

Step 7

In this step, an optically inactive compound (II) is subjected to a step of inducing one-handed helical chirality (step 7-1), then a step of forming a memory of the one-handed helical chirality by removing an optically active low-molecular-weight compound (step 7-2), thus converting same to an optically active compound (I-1) (X=X'=$CO_2H$).

Step 7-1 is performed by mixing with an optically active low-molecular-weight compound in a solvent that does not influence the reaction.

Examples of the optically active low-molecular-weight compound include the compounds exemplified above. Of those, (R)-(−)-2-phenylglycinol, (S)-(+)-2-phenylglycinol, (R)-(−)-1-phenylethylalcohol, (S)-(+)-1-phenylethylalcohol and the like are preferably used. As the optically active low-molecular-weight compound, an optically pure compound (not less than 99% ee) is preferable. However, as mentioned below, a positive nonlinear phenomenon (what is called "asymmetric amplification phenomenon") is confirmed even when a compound having a low optical purity (not less than 80% ee) is used, and helical chirality can be induced with an optical purity of the same level as that of using an optically pure compound. Therefore, a compound having a low optical purity can also be used. The low-molecular-weight compound may be a liquid or solid, preferably liquid.

The amount of the optically active low-molecular-weight compound to be used is generally 1-10 equivalents relative to compound (II) (1 equivalent).

Examples of the solvent include water, dimethyl sulfoxide (DMSO), N,N-dimethylformamide (DMF) and the like. Of these, water is preferable.

The reaction temperature is generally $0°$ C.-$120°$ C., preferably room temperature-$100°$ C., more preferably $80°$ C.-$100°$ C.

The reaction time is generally 0.5-30 hr.

In step 7-2, compound (I) having a memory of a one-handed helical structure is obtained by removing an optically active low-molecular-weight compound from a mixture containing (optically active) compound (I) having an induced one-handed helical chirality. To be specific, a base is added to the reaction mixture of step 7-1, and the optically active low-molecular-weight compound is removed by washing with an organic solvent. The aqueous phase is concentrated under reduced pressure, the precipitate is dissolved in water, and the precipitate resulting from the addition of an acid is washed with water to give an optically active compound (I-1) (X=X'=$CO_2H$).

Examples of the base include inorganic bases such as potassium hydroxide, sodium hydroxide and the like. Of these, sodium hydroxide is preferable.

The amount of the base to be used is generally 1-3 equivalents relative to compound (II) (1 equivalent).

Examples of the organic solvent to be used for removing the optically active low-molecular-weight compound by washing include chloroform, dichloromethane, diethyl ether, ethyl acetate, toluene, benzene and the like. Of these, chloroform is particularly preferable.

Examples of the acid include hydrochloric acid, phosphoric acid, sulfuric acid and the like. Of these, hydrochloric acid is preferable.

Whether one-handed helical chirality has been induced in compound (I) and whether the chirality has been memorized can be confirmed by measuring CD and UV spectra.

With what optical purity the one-handed helical chirality has been induced in compound (I) (lopsided degree of helical chirality) can be confirmed by measuring the peak intensity ($\Delta\epsilon$) of CD spectrum. That is, the higher the peak intensity is, the more lopsided toward one direction the winding direction of the helix is.

Step 8

In this step, the optically active compound (I-1) (X=X'=$CO_2H$) obtained in step 7 is amidated or esterified to convert same to compound (I-2) (X=X'=CON($R^5$) ($R^6$) or $CO_2R^8$).

The esterification reaction can be performed in the same reaction form and reaction conditions as in step 1.

The amidation reaction is performed by a method known per se (e.g., a method of reacting with amine (($R^5$) ($R^6$) NH) in the presence of a condensing agent etc.).

The reaction is performed in a solvent that does not influence the reaction and by using a condensing agent in the presence of a condensation additive as necessary.

Examples of the condensation additive include 1-hydroxybenzotriazole (HOBt), ethyl 1-hydroxy-1H-1,2,3-triazole-5-carboxylate (HOCt), 1-hydroxy-7-azabenzotriazole (HOAt) and the like.

The amount of the condensation additive to be used is preferably 0.05-1.5 equivalents relative to 1 equivalent of the optically active compound (I-1).

Examples of the condensing agent include 4-(4,6-dimethoxy-1,3,5-triazin-2-yl)-4-methylmorpholinium chloride (DMT-MM), dicyclohexylcarbodiimide (DCC), diisopropylcarbodiimide (DIC), N-ethyl-N'-[3-(dimethylamino)propyl]carbodiimide and its hydrochloride (EDC. HCl), (benzotriazol-1-yloxy)tripyrrolidinophosphonium hexafluorophosphate (PyBop), O-(benzotriazol-1-yl)-N,N,N',N'-tetramethyluronium tetrafluoroborate (TBTU), 1-[bis(dimethylamino)methylene]-5-chloro-1H-benzotriazolium 3-oxide hexafluorophosphate (HCTU), O-benzotriazole-N,N,N',N'-tetramethyluronium hexafluoroborate (HBTU) and the like. DMT-MM usable even in an aqueous solvent is particularly preferable.

The amount of the condensing agent to be used is 1-10 equivalents, preferably 1-5 equivalents, relative to 1 equivalent of the optically active compound (I-1).

Examples of the solvent include water; dimethyl sulfoxide (DMSO); aromatic hydrocarbons such as toluene, xylene and the like; ethers such as diethyl ether, tetrahydrofuran, dioxane and the like; halogenated hydrocarbons such as chloroform, dichloromethane and the like and the like, and a mixture thereof. Of these, a mixed solvent of water and DMSO, and the like are preferable.

The reaction temperature is generally 0° C.-40° C., preferably 0° C.-room temperature. The reaction time is generally 1-30 hr.

The amidation or esterification of step 8 can also be performed before induction of helical chirality, that is, before step 7. However, to efficiently produce the desired chiral stationary phase suitable for the separation target compound, it is preferably performed after step 7, since no racemization during conversion of a functional group in the side chain after induction of the helical chirality of compound (I) could be confirmed.

It is also possible to invert the winding direction of the helix of the optically active compound (I).

To be specific, conversion to optically active compound (I-1) having specific optical rotation of the opposite symbol can be performed by the aforementioned induction method of one-handed helical chirality by using optically active compound (I-1) instead of the optical inactive compound and an enantiomer of the optically active low-molecular-weight compound or an optically active low-molecular-weight compound different in kind from the optically active low-molecular-weight compound (preferably, enantiomer of the optically active low-molecular-weight compound) instead of the optically active low-molecular-weight compound.

As an enantiomer of the optically active low-molecular-weight compound or an optically active low-molecular-weight compound different in kind from the optically active low-molecular-weight compound to be used for inversion of the winding direction of helix, an optically pure compound (not less than 99% ee) is preferably used. As mentioned above, a positive nonlinear phenomenon (what is called "asymmetric amplification phenomenon") is confirmed even when a compound having a low optical purity is used, and the winding direction of helix can also be inverted with an optical purity of the same level as that of using an optically pure compound. Therefore, a compound having a low optical purity can also be used as an enantiomer of the optically active low-molecular-weight compound, or the optically active low-molecular-weight compound.

Whether the winding direction of helix of compound (I) of the present invention has been inverted can be confirmed by measuring the CD spectrum.

The degree of inversion of the winding direction of helix of the optically active compound (I) (optical purity) can be confirmed by measuring the peak intensity ($\Delta\epsilon$) of the CD spectrum of compound (I) after inversion treatment. That is, the higher the peak intensity is, the higher the degree of inversion of the winding direction of helix (shift rate to reverse-handed helix).

(Chiral Column Packing Material Supporting Optically Active Compound (I), and Production Method of Chiral Column Packed with the Packing Material for High Performance Liquid Chromatography)

While the optically active compound (I) itself can be directly used as an optical isomer separating agent, generally, it is preferably supported by carriers such as porous organic carrier, porous inorganic carrier or the like.

The most preferable carrier to be used in the present invention is silica gel. The particle size of silica gel is 0.1 μm-300 μm, preferably 1 μm-10 μm, and the average pore size is 10 Å-100 μm, preferably 50 Å-50000 Å.

A most convenient method of supporting the optically active compound (I) on silica gel is a method including dissolving the compound (I) of the present invention in DMSO, DMF or a mixed solvent of chloroform/trifluoroethanol, and coating silica gel with the solution to support compound (I).

The amount of the optically active compound (I) carried on silica gel can be confirmed by using thermogravimetric analysis.

A chiral column can be prepared by packing a column with silica gel supporting the optically active compound (I) by a slurry method (preferred as the solvent is a mixed solvent of hexane/2-propanol or methanol).

EXAMPLES

The present invention is explained in more detail by referring to Examples; however, the present invention is not limited thereby.

The reaction was monitored by thin layer chromatography using Merck 60 F254 silica gel plate (thickness 0.25 mm).

$^1$H and $^{13}$C-NMR spectra were measured by using JEOL ECA500, and deuterated chloroform, deuterated dimethyl sulfoxide and deuterium oxide as solvents. $^1$H-NMR data are reported in chemical shift (δ ppm), multiplicity (s=singlet, d=doublet, t=triplet, q=quartet, quint=quintet, m=multiplet, dd=double doublet, dt=double triplet, brs=broad singlet), coupling constant (Hz), integration and allocation.

Flash chromatography was performed by using silica gel 60N of Kanto Chemical Co., Inc. (Japan, Tokyo).

The average molecular weight was calculated based on polystyrene, by gel permeation chromatography (high performance liquid chromatography pump PU-2080 manufactured by JASCO Corporation, ultraviolet visible detector UV-970 manufactured by JASCO Corporation, column oven CO-1560 manufactured by JASCO Corporation, column KF-805L manufactured by Shodex).

For the measurement of the separation ability of the prepared compound (I) of the present invention, high performance liquid chromatography pump PU-2080 manufactured by JASCO Corporation, ultraviolet visible detector MD-910 manufactured by JASCO Corporation, and optical rotation detector OR-990 manufactured by JASCO Corporation were used. Circular dichroism (CD) was measured by using circular dichroism dispersion meter J-725 manufactured by JASCO Corporation, ultraviolet visible absorption was measured by using ultraviolet visible spectrophotometer V-570 manufactured by JASCO Corporation, and infrared absorption was measured by using infrared spectrophotometer FT/IR-460 manufactured by JASCO Corporation.

The "room temperature" in the following Examples generally shows about 10° C. to about 25° C. The ratio indicated for the mixed solvent shows, unless otherwise specified, a volume mixing ratio. % shows wt % unless otherwise specified.

Example 1

Synthesis of Compound (IIa)

(1) Synthesis of heptyl 4-iodobenzoate (2a)

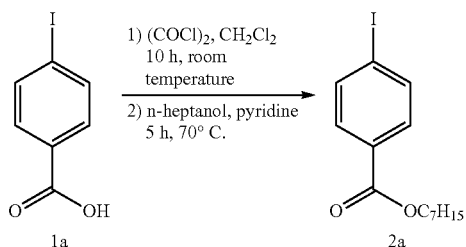

Under a nitrogen atmosphere, 4-iodobenzoic acid (1a) (10.6 g, 42.9 mmol) was dissolved in anhydrous dichloromethane (140 mL), and several drops of anhydrous N,N-dimethylformamide were added. Thereafter, oxalyl chloride (4.50 mL, 42.4 mmol) was added at 0° C., and the mixture was stirred at room temperature for 10 hr. The solvent was removed, anhydrous pyridine (70 mL) and n-heptanol (7.0 mL, 49.4 mmol) were added, and the mixture was stirred at 70° C. for 5 hr. The reaction solvent was removed, the residue was diluted with ethyl acetate, washed with distilled water and saturated aqueous sodium hydrogen carbonate solution, and the organic layer was dried over anhydrous sodium sulfate. The solvent was removed under reduced pressure, and the residue was purified by column chromatography (ethyl acetate:hexane=1:19) to give heptyl 4-iodobenzoate (2a) (14.5 g, yield 97%) as an oily liquid.

(2) Synthesis of heptyl 4-[(trimethylsilyl)ethynyl]benzoate (3a)

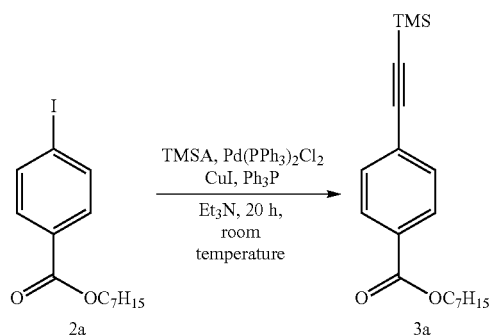

Under a nitrogen atmosphere, heptyl 4-iodobenzoate (2a) (10.1 g, 29.3 mmol) was dissolved in anhydrous triethylamine (50 mL), $Pd(PPh_3)_2Cl_2$ (0.0820 g, 0.117 mmol), triphenylphosphine (0.126 g, 0.480 mmol), copper (I) iodide (0.135 g, 0.192 mmol), and trimethylsilylacetylene (TMSA) (4.30 mL, 31.7 mmol) were added, and the mixture was stirred at room temperature for 20 hr. The reaction solution was filtered through celite, the solvent was removed under reduced pressure, and the residue was purified by column chromatography (ethyl acetate:hexane=1:30) to give heptyl 4-[(trimethylsilyl)ethynyl]benzoate (3a) (9.23 g, yield 98%) as an oily liquid.

(3) Synthesis of heptyl 4-ethynylbenzoate (4a)

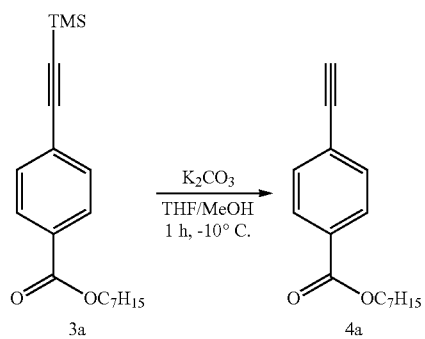

Heptyl 4-[(trimethylsilyl)ethynyl]benzoate (3a) (10.4 g, 32.8 mmol) was dissolved in tetrahydrofuran/methanol (3/1, v/v) (400 mL), potassium carbonate (1.00 g, 7.24 mmol) was added, and the mixture was stirred at −10° C. for 1 hr. The reaction solvent was concentrated, and the residue was diluted with ethyl acetate, washed with 1N hydrochloric acid and saturated aqueous sodium hydrogen carbonate solution, and the organic layer was dried over anhydrous sodium sulfate. The solvent was removed under reduced pressure, and the residue was purified by column chromatography (ethyl acetate:hexane=1:25) to give heptyl 4-ethynylbenzoate (4a) (6.58 g, yield 82%) as an oily liquid.

(4) Synthesis of bis[4-(heptyloxycarbonyl)phenyl]acetylene (5a)

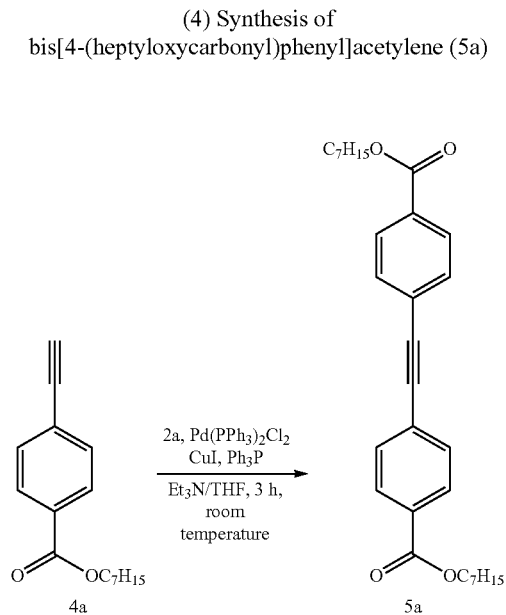

Under a nitrogen atmosphere, heptyl 4-iodobenzoate (2a) (3.64 g, 10.5 mmol) was dissolved in anhydrous triethylamine (8.6 mL), and anhydrous tetrahydrofuran (4.0 mL), triphenylphosphine (39.3 mg, 0.150 mmol), copper (I) iodide (43.8 mg, 0.230 mmol), and Pd(PPh$_3$)$_2$Cl$_2$ (27.9 mg, 0.0397 mmol) were added. Thereafter, a solution of heptyl 4-ethynylbenzoate (4a) (2.64 g, 10.8 mmol) in anhydrous tetrahydrofuran (2.0 mL) was slowly added dropwise, and the mixture was stirred at room temperature for 3 hr. The reaction solution was filtered through celite and, after removal under reduced pressure, diluted with ethyl acetate, washed with water and saturated brine, and the organic layer was dried over anhydrous sodium sulfate. The solvent was removed under reduced pressure, and the residue was purified by column chromatography (ethyl acetate:hexane=1:10). Subsequent recrystallization from methanol/ethanol (5:1, v/v) gave bis[4-(heptyloxycarbonyl)phenyl]acetylene (5a) (4.64 g, yield 95%) as a white solid.

mp: 61.3-62.4° C.;

IR (KBr, cm$^{-1}$): 1943 (C≡C), 1707 (C=O);

$^1$H NMR (500 MHz, CDCl$_3$, rt): δ 8.04 (d, J=8.6 Hz, 4H, Ar—H), 7.60 (d, J=8.0 Hz, 4H, Ar—H), 4.33 (t, J=6.6 Hz, 4H, 2OCH$_2$CH$_2$), 1.76 (quint, J=6.6 Hz, 4H, 2OCH$_2$CH$_2$), 1.25-1.47 (m, 16H, 8CH$_2$), 0.90 (t, J=6.9 Hz, 6H, 2CH$_3$);

$^{13}$C NMR (125 MHz, CDCl$_3$, rt): δ166.19, 131.76, 130.46, 129.68, 127.38, 91.49, 65.56, 31.88, 29.11, 28.85, 26.15, 22.75, 14.23;

Elemental analysis: Calcd for C$_{30}$H$_{38}$O$_4$: C, 77.89; H, 8.28. Found: C, 77.60; H, 8.37.

(5) Synthesis of Compound (6a) by Polymerization of Compound (5a)

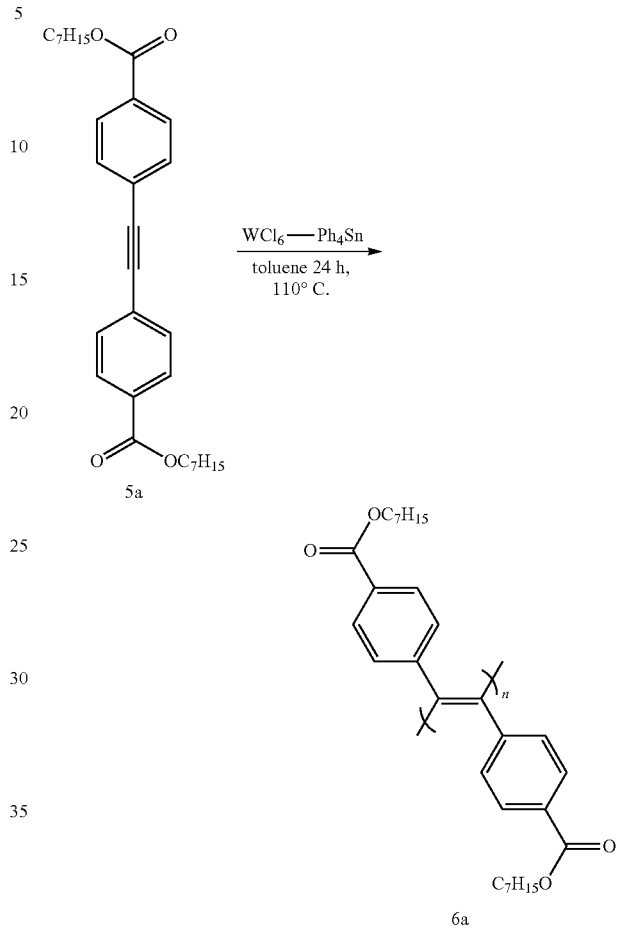

Under a nitrogen atmosphere, bis[4-(heptyloxycarbonyl)phenyl)]acetylene (5a) (600 mg, 1.30 mmol), tungsten (VI) chloride (51.6 mg, 0.130 mmol), and tetraphenyltin (IV) (55.5 mg, 0.130 mmol) were charged in a Schlenk tube, and anhydrous toluene (2.6 mL) distilled in vacuo was added. Thereafter, the mixture was stirred at 110° C. for 24 hr. After cooling to room temperature, the mixture was reprecipitated in a large amount of methanol and centrifuged to give a yellow ocher solid. Then, the solid was dissolved in a small amount of toluene, reprecipitated in a large amount of a mixed solvent of tetrahydrofuran/methanol (3:1, v/v), and poly(diphenylacetylene)heptyl ester (compound (6a)) (404 mg, yield 67%) was recovered by centrifugation as a yellow ocher solid. The number average molecular weight M$_n$ of compound (6a) calculated based on polystyrene as measured by gel permeation chromatography measurement was 1.46×10$^4$ and the dispersity M$_w$/M$_n$ was 1.58.

IR (KBr, cm$^{-1}$): 1721 (C=O);

$^1$H NMR (500 MHz, CDCl$_3$, 50° C.): δ 7.16-7.28 (br, 4H, Ar—H), 6.41-6.71 (br, 2H, Ar—H), 5.92-6.15 (br, 2H, Ar—H), 4.03-4.48 (br, 4H, 2OCH$_2$CH$_2$), 1.60-1.93 (br, 4H, 2OCH$_2$CH$_2$), 1.25-1.47 (br, 16H, 8CH$_2$), 0.79-1.04 (br, 6H, 2CH$_3$);

Elemental analysis: Calcd for C$_{30}$H$_{38}$O$_4$: C, 77.89; H, 8.28. Found: C, 77.40; H, 8.42.

(6) Synthesis of Compound (IIa) by Hydrolysis of Compound (6a)

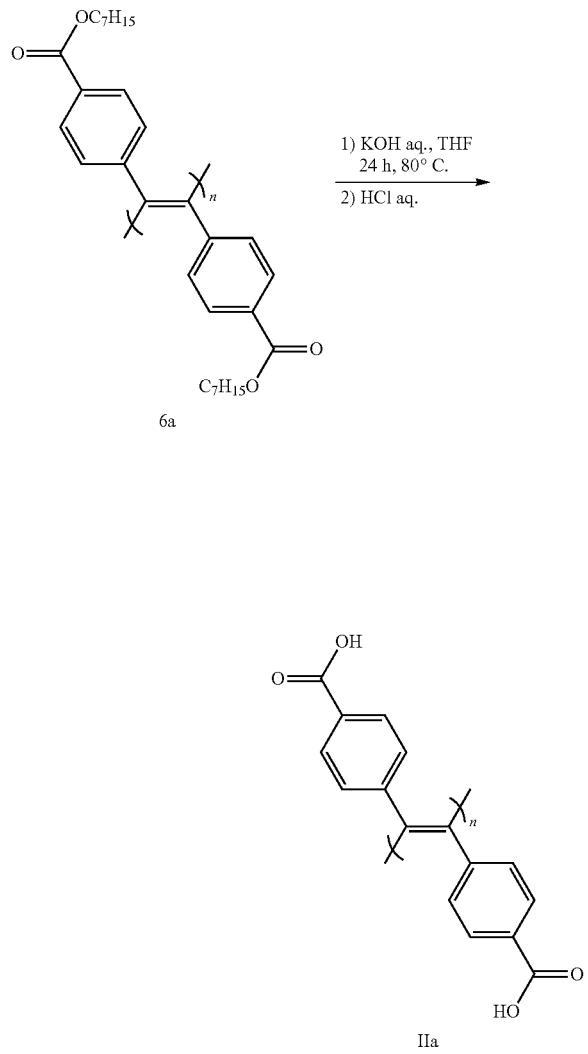

Compound (6a) (400 mg) was dissolved in tetrahydrofuran (15 mL), 4N aqueous potassium hydroxide solution (35 mL) was added, and the mixture was stirred at 80° C. for 2 hr. Thereafter, tetrahydrofuran was evaporated, 4N aqueous potassium hydroxide solution (30 mL) was added, and the mixture was stirred at 80° C. for 24 hr. Distilled water was added to the reaction solution, and the mixture was washed with diethyl ether and chloroform. The aqueous layer was acidified with 1N hydrochloric acid, and the precipitated solid was collected by centrifugation, and thereafter washed with distilled water to give poly(diphenylacetylene)carboxylic acid (optically inactive form) (compound (IIa)) (180 mg, yield 78%) as a brown solid.

IR (KBr, cm$^{-1}$): 1701 (C═O);

$^1$H NMR (500 MHz, d$_6$-DMSO/D$_2$O (1:1, v/v), 80° C.): δ 7.19-6.88 (br, 4H, Ar—H), 6.53-6.31 (br, 2H, Ar—H), 6.12-5.82 (br, 2H, Ar—H); Elemental analysis: Calcd for (C$_{16}$H$_{10}$O$_4$.2.1H$_2$O)$_n$: C, 63.20; H, 4.71. Found: C, 63.04; H, 4.55.

Example 2

Induction and Memory of One-Handed Helical Chirality in Optical Inactive Compound (IIa)

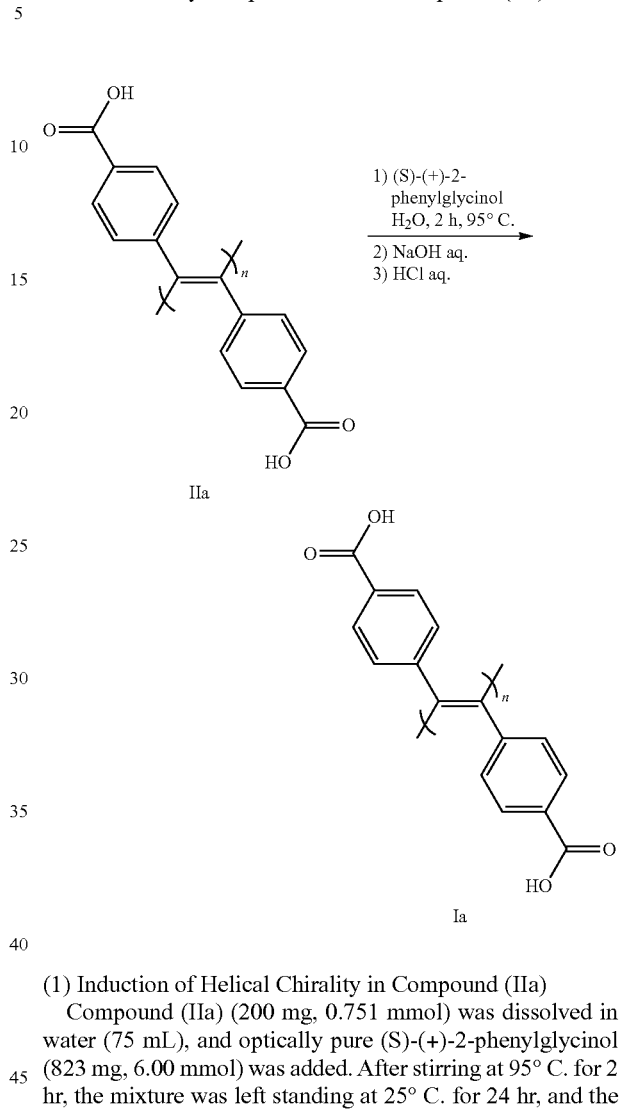

(1) Induction of Helical Chirality in Compound (IIa)

Compound (IIa) (200 mg, 0.751 mmol) was dissolved in water (75 mL), and optically pure (S)-(+)-2-phenylglycinol (823 mg, 6.00 mmol) was added. After stirring at 95° C. for 2 hr, the mixture was left standing at 25° C. for 24 hr, and the CD spectrum of the solution was measured (cell length: 0.1 cm, measurement temperature: 25° C.) (FIG. 1(a)). As a result, a clear Cotton effect was observed in the absorption region of the main chain, whereby it was suggested that a one-handed helical structure was induced in compound (IIa), and an optically active compound (Ia) was produced.

(2) Memory of Helical Chirality in Compound (Ia)

To an aqueous solution of the optically active compound (Ia), in which the one-handed helical structure was induced by the aforementioned treatment, was added sodium hydroxide (33 mg, 0.83 mmol). The mixture was washed with chloroform, and the aqueous layer was concentrated under reduced pressure. Thereafter, the concentrate was reprecipitated in a large amount of acetone, and a sodium salt of compound (Ia) was collected by centrifugation. The sodium salt of compound (Ia) was dissolved in a small amount of water, the solution was acidified with 1N hydrochloric acid, and the precipitated solid was collected by centrifugation and washed with distilled water to give compound (Ia) (184 mg, yield 92%) as a brown solid. The obtained compound (Ia) was dissolved in dimethyl sulfoxide, and CD was measured. As a result, induced CD similar to that with a mixed solution of compound (Ia) and (S)-(+)-2-phenylglycinol was observed (FIG. 1(b)). Therefore, it was confirmed that the one-handed helical structure of compound (Ia) is retained in compound (Ia) as a memory even after removal of the optically pure (S)-(+)-2-phenylglycinol.

Example 3

Synthesis of Optically Active Compound (Ib) by Amidation Reaction of Side Chain Carboxy Group of Optically Active Compound (Ia) Having One-Handed Helical Structure

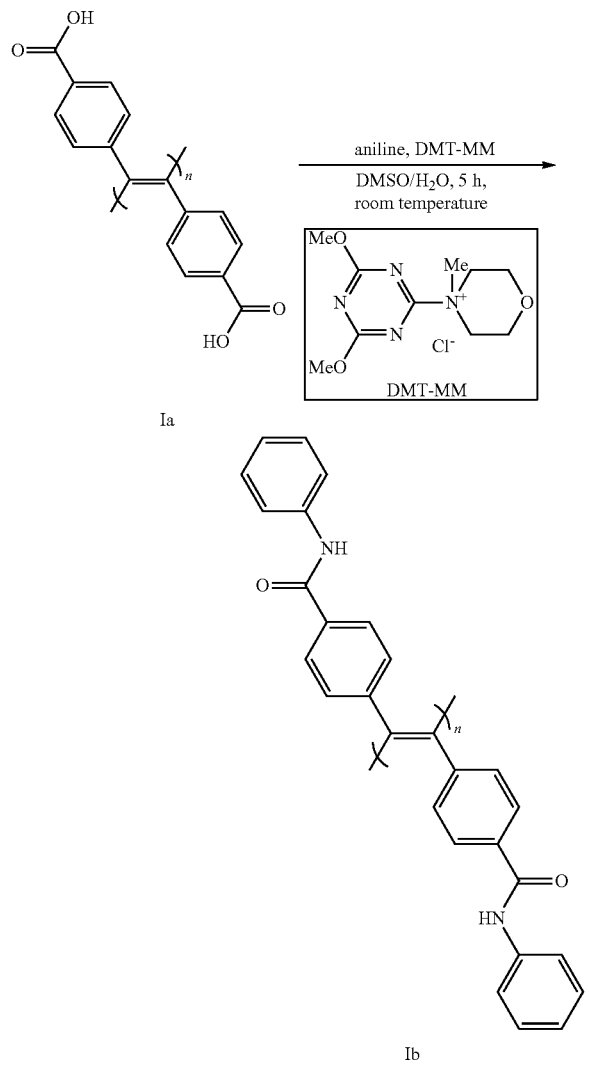

The optically active compound (Ia) (170 mg, 0.638 mmol) was dissolved in dimethyl sulfoxide/water (5:1, v/v) (30 mL), aniline (238 mg, 2.55 mmol) and 4-(4,6-dimethoxy-1,3,5-triazin-2-yl)-4-methylmorpholinium chloride (DMT-MM) (706 mg, 2.55 mmol) were added, and the mixture was stirred at room temperature for 5 hr. The precipitated solid was collected by centrifugation, dissolved in a small amount of tetrahydrofuran, reprecipitated in a large amount of a mixed solvent of water/methanol (5:1, v/v), collected by centrifugation, and washed with methanol to give compound (Ib) (186 mg, yield 70%) as a dark red solid. The obtained compound (Ib) was dissolved in dimethyl sulfoxide, and CD was measured. As a result, induced CD similar to that with compound (Ia) having an one-handed helical structure (FIG. 1(c)). Therefore, it was confirmed that the one-handed helical structure induced and memorized in compound (Ia) is retained in compound (Ib) as a memory even after chemical modification (amidation).

Example 4

Preparation of Column and Evaluation of Asymmetric Discrimination Ability (1) Preparation of Chiral Column for Optical Resolution Supporting Optically Active Compound (Ib)

The optically active compound (Ib) (120 mg) was dissolved in chloroform/trifluoroethanol (5:1, v/v) (4.8 mL), and supported on silica gel for HPLC (manufactured by DAISO CO., LTD.: particle size 7 μm). The obtained polymer supporting gel was packed in a stainless column (length 25 cm, inner diameter 0.20 cm) by the slurry method (solvent: hexane/2-propanol (9:1, v/v)).

(2) Optical Resolution of 3,3'-Diphenyl-1,1'-Bi-2-Naphthol Using Chiral Column

Figure 2:
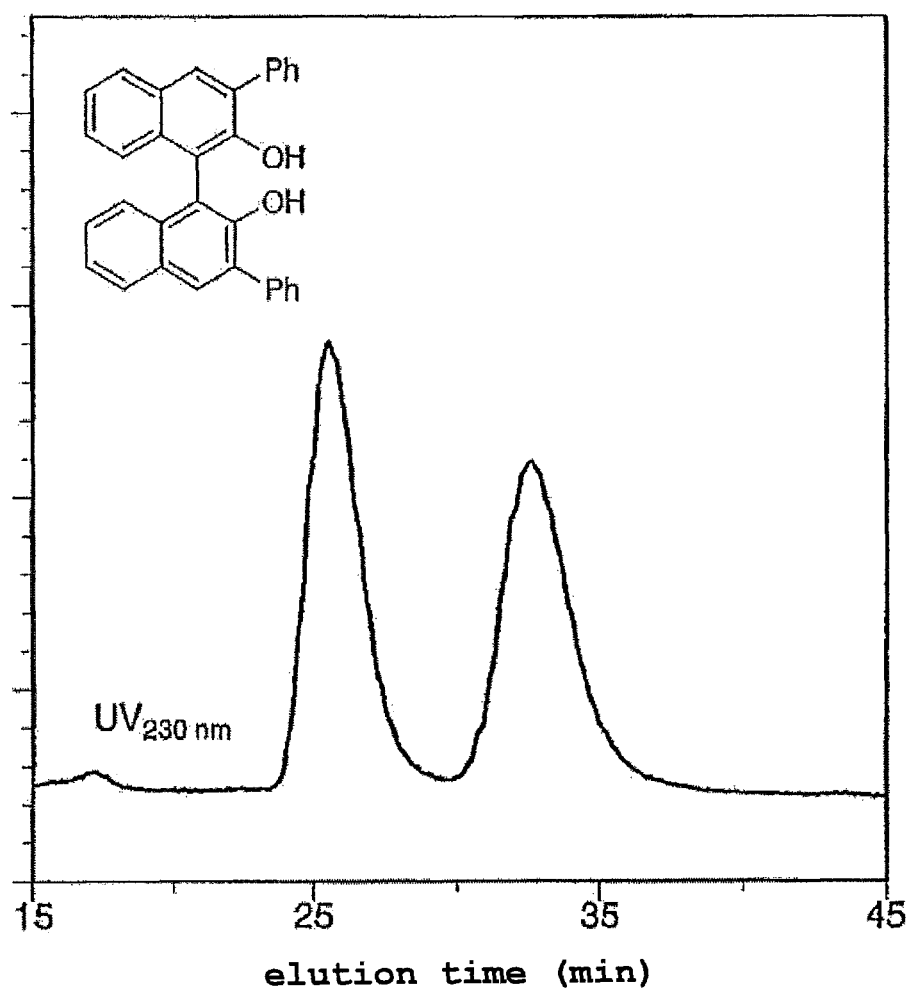
FIG. 2 shows a chiral separation chromatogram (flow rate: 0.1 mL/min, eluent: hexane/2-propanol (90:10, v/v)) of a racemate of 3,3'-diphenyl-1,1'-bi-2-naphthol by using the column obtained in Example 4 (compound (Ib) supported by silica gel) at about 0° C.

Using the chiral column prepared by the operation of the above-mentioned (1), optical resolution of 3,3'-diphenyl-1,1'-bi-2-naphthol was performed by HPLC (room temperature: about 20° C.) (FIG. 2). The eluent used was hexane/2-propanol=90/10 (v/v), and the flow rate was 0.1 mL/min. The time $t_0$ necessary for the eluent to pass through the column was determined from the elution time of 1,3,5-tri-tert-butyl-benzene. As a result, $k_1$=1.57, α=1.51 was estimated (Table 1).

(3) Confirmation of Asymmetric Discrimination Ability of Chiral Column by HPLC

Using the chiral column prepared by the operation of the above-mentioned (1), optical resolutions of racemates of various compounds were performed by HPLC (flow rate 0.1 mL/min (hexane/2-propanol=90/10, 50/50) or 0.2 mL/min (hexane/2-propanol=99/1). The separation conditions and the results are shown in Table 1.

TABLE 1

| No. | racemate | eluent | $k_1$* | separation factor α** |
|---|---|---|---|---|
| 1 | (structure: Ph-O-cyclopropyl-Ph) | hexane/2-propanol = 90/10 | 0.69 | 1.19 (−) |

TABLE 1-continued

| No. | racemate | eluent | $k_1$* | separation factor $\alpha$** |
|---|---|---|---|---|
| 2 | (diazabicyclic compound with two methyl-substituted benzene rings) | hexane/2-propanol = 90/10 | 0.77 | 1.12 (−) |
| 3 | Ph—CH(OH)—C(=O)—Ph | hexane/2-propanol = 90/10 | 1.78 | 1.20 (−) |
| 4 | 3,3'-diphenyl-2,2'-dihydroxy-1,1'-binaphthyl | hexane/2-propanol = 90/10 | 1.57 | 1.51 (n. d.) |
| 5 | 2,2'-dimethoxy-1,1'-binaphthyl | hexane/2-propanol = 99/1 | 2.45 | 1.60 (n. d.) |
| 6 | Co(acac)$_3$ | hexane/2-propanol = 50/50 | 5.65 | 4.90 (+) |
| 7 | Cr(acac)$_3$ | hexane/2-propanol = 50/50 | 6.62 | 2.94 (−) |
| 8 | Ru(acac)$_3$ | hexane/2-propanol = 50/50 | 9.22 | 3.42 (−) |

*$k_1$: retention factor of enantiomer eluted first
**symbol in parenthesis is optical rotation of enantiomer eluted first As used herein, the retention factor $k_1$ is an index showing the degree of strength of the interaction between an enantiomer eluted first and the packing material. To be specific, it is calculated by the formula represented by: $k_1=(t_1-t_0)/t_0$ (wherein $t_1$ is elution time of enantiomer which is eluted first, and $t_0$ is the time when a substance (1,3,5-tri-tert-butylbenzene) that does not at all interact with the packing material is eluted). In addition, the separation factor $\alpha$ means a ratio of the retention factors of the both enantiomers. To be specific, it is calculated by the formula represented by: $\alpha=k_2/k_1$ (wherein $k_1$ is the retention factor of the enantiomer which is eluted first, and $k_2$ is the retention factor of the enantiomer which is eluted later). Generally, when $\alpha$ is 1, it means that the elution time is completely the same and separation is not attainable. When $\alpha$ is >1, it means that the both enantiomers are separable. Generally, when a is 1.2 or above, it means that complete separation to the foot of the peak is attainable.

According to Table 1, the chiral column supporting the optically active compound (Ib) was confirmed to extremely efficiently separate racemates of a wide variety of chiral compounds such as ether, ketone, amine, phenol, alcohol, metal complex and the like.

Example 5

Induction of One-Handed Helical Chirality by Using Low-Molecular-Weight Compound Having Low Optical Purity (Confirmation of Nonlinear Effect)

(1) To an aqueous solution of the optically inactive compound (IIa) (2 mg/mL, 5 mL) were added 20% ee, 40% ee, 60% ee, 80% ee and 100% ee aqueous solutions of (S)-(−)-1-phenylethylamine to prepare 1.9 mM aqueous solutions of compound (IIa) ([1-phenylethylamine]/[compound (IIa)]= 50). After stirring at 95° C. for 2 hr, the mixtures were left standing at 25° C. for 24 hr, and the CD and UV spectra of the resulting optically active compounds (Ia) were measured at 25° C.

Figure 3:
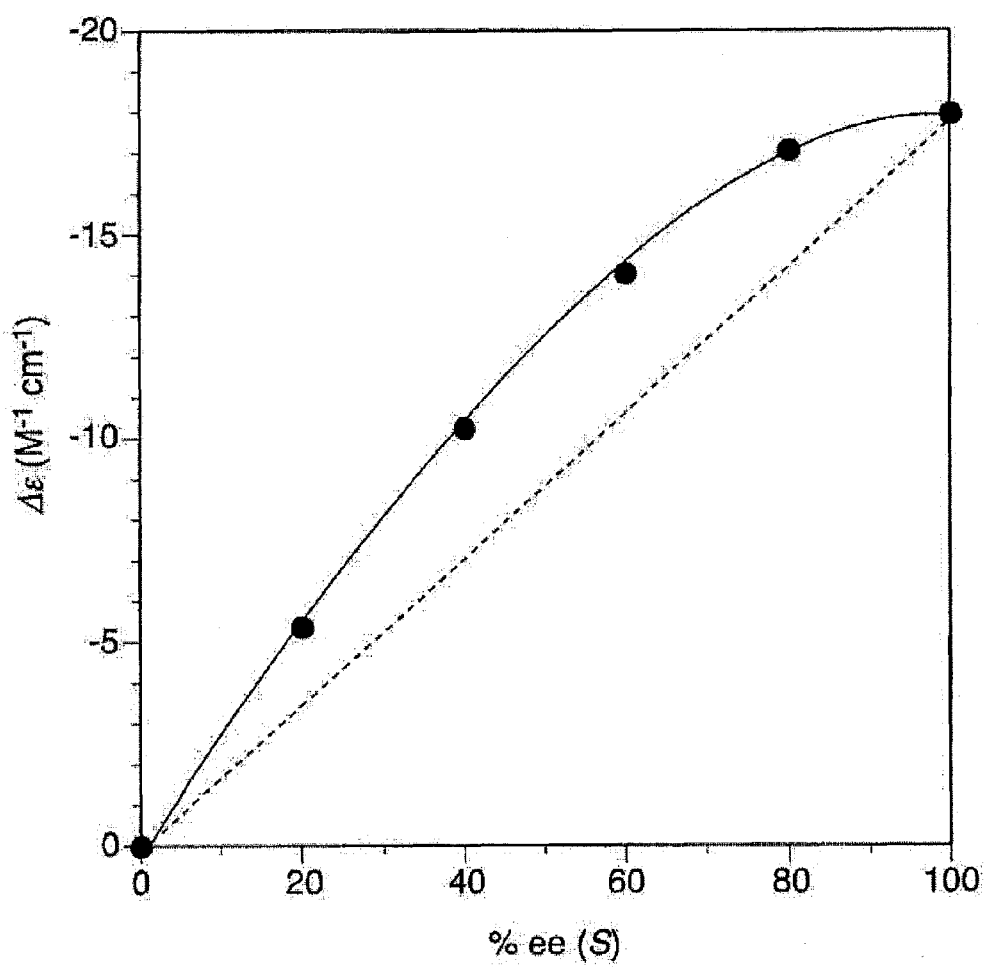
FIG. 3 shows a positive nonlinear effect of the peak intensity ($\Delta\epsilon$) (vertical axis) of CD spectrum of compound (Ia) (1.9 mM) after stirring in the presence of 0-100% ee of (S)-(−)-1-phenylethylamine([(S)-(−)-1-phenylethylamine]/[compound (IIa)]=50) in water at 95° C. for 2 hr, and then standing at 25° C. for 24 hr, and the optical purity (horizontal axis) of (S)-(−)-1-phenylethylamine.

As a result, as shown in FIG. 3, peak intensity (As) in CD spectrum which is of the same level as that of using optically pure (S)-(−)-1-phenylethylamine was observed by using (S)-(−)-1-phenylethylamine having an optical purity of not less than 80% ee, in the induction of helical chirality in compound (IIa) (conversion to optically active compound (Ia)). Therefrom a positive nonlinear phenomenon (what is called "asymmetric amplification phenomenon") could be confirmed in the induction of helical chirality in compound (IIa).

INDUSTRIAL APPLICABILITY

According to the present invention, a poly(diphenylacetylene) compound having a one-handed helical structure can be conveniently synthesized, and the winding direction of helix thereof can also be controlled freely by selecting the absolute configuration of an optically active low-molecular-weight compound to be used for the induction of helical chirality. Since the optically active compound (I) of the present invention can be chemically modified variously after induction and memory of helical chirality, it is advantageous in that the chemical structure can be easily optimized according to the kind of a separation target compound. According to the present invention, moreover, an optically active low-molecular-weight compound used for the induction of the helical chirality is easily recoverable and recyclable, and the present invention can be applied to the optical resolution of a wide variety of chiral compounds, and shows high separation ability. Therefore, an economical and effective separation method of optical isomer can be provided. Furthermore, according to the present invention, a positive nonlinear effect is observed between the optical purity of an optically active low-molecular-weight compound to be added for the induction of helical chirality and the intensity of helical chirality induction, a practically superior production method of a chiral stationary phase can be provided.

While some of the embodiments of the present invention have been described in detail in the above, it is, however, possible for those of ordinary skill in the art to make various modifications and changes to the particular embodiments shown without substantially departing from the teaching and advantages of the present invention. Such modifications and changes are encompassed in the spirit and scope of the present invention as set forth in the appended claims.

This application is based on a patent application No. 2013-024423 filed in Japan, the contents of which are incorporated in full herein.

The invention claimed is:

1. A poly(diphenylacetylene) compound represented by the formula (I):

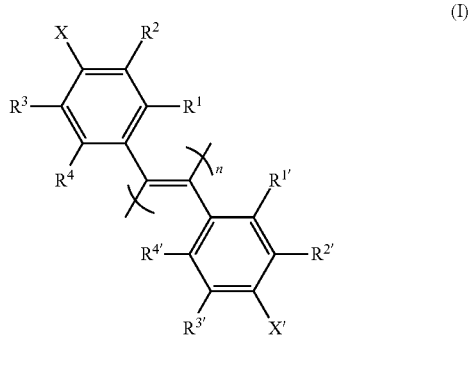

[wherein
$R^1$, $R^{1'}$, $R^2$, $R^{2'}$, $R^3$, $R^{3'}$, $R^4$ and $R^{4'}$ are each independently a hydrogen atom, a halogen atom, an optionally substituted alkyl group, an optionally substituted cycloalkyl group, an optionally substituted alkoxy group, an optionally substituted alkylthio group, a tri-substituted silyl group, a tri-substituted siloxy group or an optionally substituted acyloxy group;
X and X' are each independently an optionally amidated or esterified carboxy group; and
n is an integer of not less than 10], or a salt thereof, or a solvate thereof.

2. The compound according to claim 1, which has a one-handed helical structure, or a salt thereof, or a solvate thereof.

3. The compound according to claim 2, wherein each of $R^1$ and $R^{1'}$, $R^2$ and $R^{2'}$, $R^3$ and $R^{3'}$, and $R^4$ and $R^{4'}$ are the same group, or a salt thereof, or a solvate thereof.

4. The compound according to claim 2, wherein X and X' are both carboxy groups or $CON(R^5)(R^6)$ (wherein $R^5$ is a hydrogen atom or a $C_{1-6}$ alkyl group, and $R^6$ is an optionally substituted $C_{1-20}$ alkyl group or an optionally substituted aryl group), or a salt thereof, or a solvate thereof.

5. The compound according to claim 2, wherein $R^1$, $R^{1'}$, $R^2$, $R^{2'}$, $R^3$, $R^{3'}$, $R^4$ and $R^{4'}$ are each independently a hydrogen atom, a halogen atom, a $C_{1-6}$ alkyl group optionally substituted by halogen atom(s), a $C_{1-6}$ alkoxy group optionally substituted by halogen atom(s), a tri $C_{1-6}$ alkylsilyl group or a tri $C_{1-6}$ alkylsiloxy group, and each of $R^1$ and $R^{1'}$, $R^2$ and $R^{2'}$, $R^3$ and $R^{3'}$, and $R^4$ and $R^{4'}$ are the same group;
X and X' are each $CON(R^5)(R^6)$ (wherein $R^5$ is a hydrogen atom or a $C_{1-6}$ alkyl group, and $R^6$ is a optionally substituted $C_{6-10}$ aryl group); and
n is an integer of not less than 10 and not more than 10000, or a salt thereof, or a solvate thereof.

6. The compound according to claim 2, wherein $R^1$, $R^{1'}$, $R^2$, $R^{2'}$, $R^3$, $R^{3'}$, $R^4$ and $R^{4'}$ are each independently a hydrogen atom or a halogen atom, and each of $R^1$ and $R^{1'}$, $R^2$ and $R^{2'}$, $R^3$ and $R^{3'}$, and $R^4$ and $R^{4'}$ is the same group;
X and X' are each $CON(R^5)(R^6)$ (wherein $R^5$ is a hydrogen atom, and $R^6$ is an optionally substituted phenyl group); and
n is an integer of not less than 100 and not more than 10000, or a salt thereof, or a solvate thereof.

7. An optical isomer separating agent comprising the poly(diphenylacetylene) compound according to claim 2.

8. A packing material comprising the optical isomer separating agent according to claim 7 supported on a carrier.

9. A production method of the compound according to claim 2, or a salt thereof, or a solvate thereof, comprising a step of mixing an optical inactive poly(diphenylacetylene) compound represented by the formula (II):

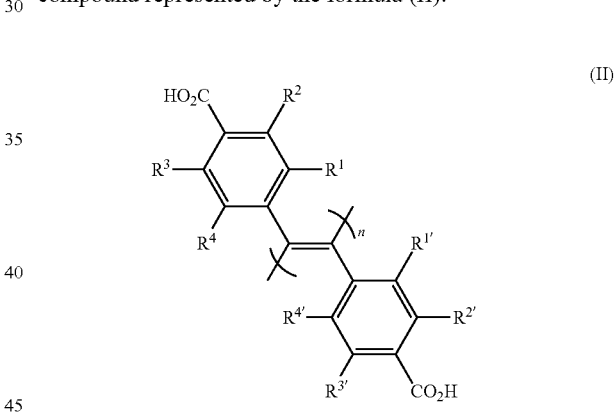

[wherein
$R^1$, $R^{1'}$, $R^2$, $R^{2'}$, $R^3$, $R^{3'}$, $R^4$ and $R^{4'}$ are each independently a hydrogen atom, a halogen atom, an optionally substituted alkyl group, an optionally substituted cycloalkyl group, an optionally substituted alkoxy group, an optionally substituted alkylthio group, a tri-substituted silyl group, a tri-substituted siloxy group or an optionally substituted acyloxy group; and
n is an integer of not less than 10],
with an optically active low-molecular-weight compound, and a step of removing a low-molecular-weight compound.

10. The method according to claim 9, further comprising a step of esterification or amidation.

11. The method according to claim 9, wherein the optically active low-molecular-weight compound is an optically active form of a compound selected from the group consisting of 2-phenylglycinol, 1-cyclohexylethylamine, 1-(1-naphthyl)ethylamine, 1-(2-naphthyl)ethylamine, sec-butylamine, 1-phenyl-2-(p-tolyl)ethylamine, 1-(p-tolyl)ethylamine, 1-(4-methoxyphenyl)ethylamine, 1-phenylethylamine, β-methylphenethylamine, 2-amino-1-butanol, 2-amino-1,2-diphenylethanol, 1-amino-2-indanol, 2-amino-1-phenyl-1,3-propanediol, 2-amino-1-propanol, leucinol, phenylalaninol, valinol, norephedrine, methioninol, amino acid, amino acid having a protected carboxy group, 3-aminopyrrolidine, 1-benzyl-3-aminopyrrolidine, 1,2-diphenylethylenediamine, 1,2-cyclohexanediamine, 2-(methoxymethyl)pyrrolidine, 1-methyl-2-(1-piperidinomethyl)pyrrolidine and 1-(2-pyrrolidinomethyl)pyrrolidine.

12. The method according to claim 9, wherein the optically active low-molecular-weight compound is (S)-(+)-2-phenylglycinol or (R)-(−)-2-phenylglycinol.

13. The method according to claim 9, wherein the optically active low-molecular-weight compound has an optical purity of not less than 99% ee.

14. The method according to claim 9, wherein the optically active low-molecular-weight compound has an optical purity of not less than 80% ee.

15. The method according to claim 9, wherein the optically active low-molecular-weight compound is removed by washing with solvent.

\* \* \* \* \*